United States Patent
Nakamura

(10) Patent No.: US 7,983,177 B2
(45) Date of Patent: *Jul. 19, 2011

(54) COMMUNICATION NODE, AND RING CONFIGURATION METHOD AND RING ESTABLISHMENT METHOD IN COMMUNICATION SYSTEM

(75) Inventor: Masato Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 12/307,065

(22) PCT Filed: Jun. 30, 2006

(86) PCT No.: PCT/JP2006/313128
§ 371 (c)(1),
(2), (4) Date: Dec. 30, 2008

(87) PCT Pub. No.: WO2008/001468
PCT Pub. Date: Jan. 3, 2008

(65) Prior Publication Data
US 2009/0316588 A1 Dec. 24, 2009

(51) Int. Cl.
*H04L 12/26* (2006.01)
(52) U.S. Cl. ....................................... 370/249
(58) Field of Classification Search .............. 370/216, 370/221, 222, 241, 249, 254, 258; 709/251
See application file for complete search history.

(56) References Cited

U.S. PATENT DOCUMENTS

| | | | |
|---|---|---|---|
| 4,404,557 A * | 9/1983 | Grow | 370/455 |
| 5,031,174 A | 7/1991 | Natsume | |
| 5,305,317 A * | 4/1994 | Szczepanek | 370/257 |
| 5,404,134 A | 4/1995 | Jinzaki et al. | |
| 5,414,700 A | 5/1995 | Yang et al. | |
| 6,195,704 B1 * | 2/2001 | Suita | 709/239 |
| 6,584,101 B2 | 6/2003 | Hagglund et al. | |

(Continued)

FOREIGN PATENT DOCUMENTS

JP 58-111454 A 7/1983

(Continued)

OTHER PUBLICATIONS

Yoshinobu Kato, "Ethernet, Shintenchi ni Idomu", Nikkei Communication, Nov. 2001, pp. 97-98, No. 353, Nikkei Business Publications, Inc.

(Continued)

*Primary Examiner* — Chi H Pham
*Assistant Examiner* — Robert Lopata
(74) *Attorney, Agent, or Firm* — Sughrue Mion, PLLC

(57) ABSTRACT

A plurality of communication nodes are one-to-one connected to each other by Ethernet (registered trademark) which is duplicated with a normal-system ring and with a standby-system ring. The communication node includes an A port, a B port, and a communication processor that performs a process of receiving a frame output from the B port and a process of transmitting the frame from the normal-system ring from the B port when the communication is normal. When other communication node performs a loop-back process due to communication abnormality, the communication node performs only a process of forwarding a frame input from the standby-system ring in the B port without receiving the frame and performs a process of transmitting the frame from the A port to the standby-system ring.

8 Claims, 28 Drawing Sheets

U.S. PATENT DOCUMENTS

| | | | |
|---|---|---|---|
| 7,382,789 B2 * | 6/2008 | Yu | 370/401 |
| 7,526,526 B2 * | 4/2009 | Clemens et al. | 709/208 |
| 2002/0010793 A1 * | 1/2002 | Noll et al. | 709/240 |
| 2002/0073223 A1 * | 6/2002 | Darnell et al. | 709/232 |
| 2003/0118021 A1 * | 6/2003 | Donoghue et al. | 370/392 |
| 2004/0052521 A1 * | 3/2004 | Halgren et al. | 398/19 |
| 2004/0057375 A1 * | 3/2004 | Shiragaki et al. | 370/216 |
| 2006/0198315 A1 * | 9/2006 | Sasagawa et al. | 370/244 |
| 2006/0224659 A1 * | 10/2006 | Yu | 709/201 |

FOREIGN PATENT DOCUMENTS

| | | |
|---|---|---|
| JP | 58-220538 A | 12/1983 |
| JP | 60-236543 A | 11/1985 |
| JP | 62-076949 A | 4/1987 |
| JP | 62-169543 A | 7/1987 |
| JP | 05-167592 A | 7/1993 |
| JP | 11-127181 A | 5/1999 |
| JP | 2000-278306 A | 10/2000 |
| JP | 2002-101107 A | 4/2002 |
| JP | 2005-210279 A | 8/2005 |
| TW | 353838 A | 3/1999 |

OTHER PUBLICATIONS

Karl F. Pieper, et al., "Details of FDDI Technology-Construction of 100 Mbps LAN", Aug. 1993, pp. 67-73, Published by Kyoritsu Shuppan Co.

Office Action mailed Apr. 19, 2011 in corresponding Japanese Application No. 2008-522271.

* cited by examiner

FIG.9-1

| NODE NAME (STATION) | SERIAL NUMBER | TIME (ISSUANCE TIME) |
| --- | --- | --- |
| #3 STATION | No.2 | T2 |

FIG.9-2

| NODE NAME (STATION) | SERIAL NUMBER | TIME (ISSUANCE TIME) |
| --- | --- | --- |
| #3 STATION | No.1 | T1 |

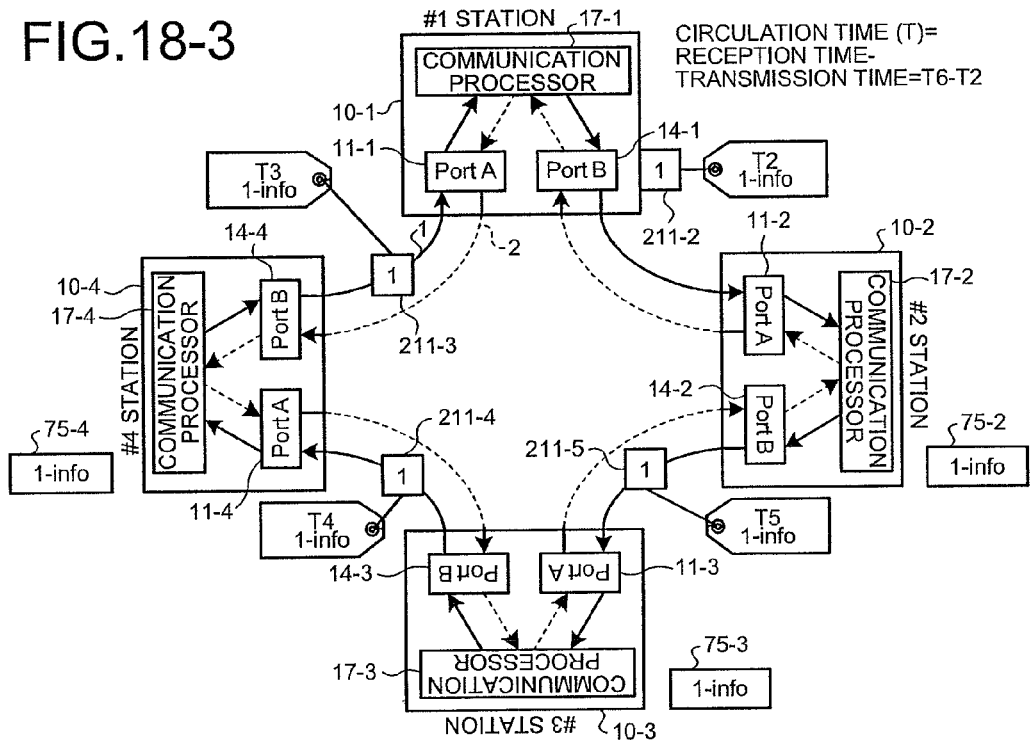
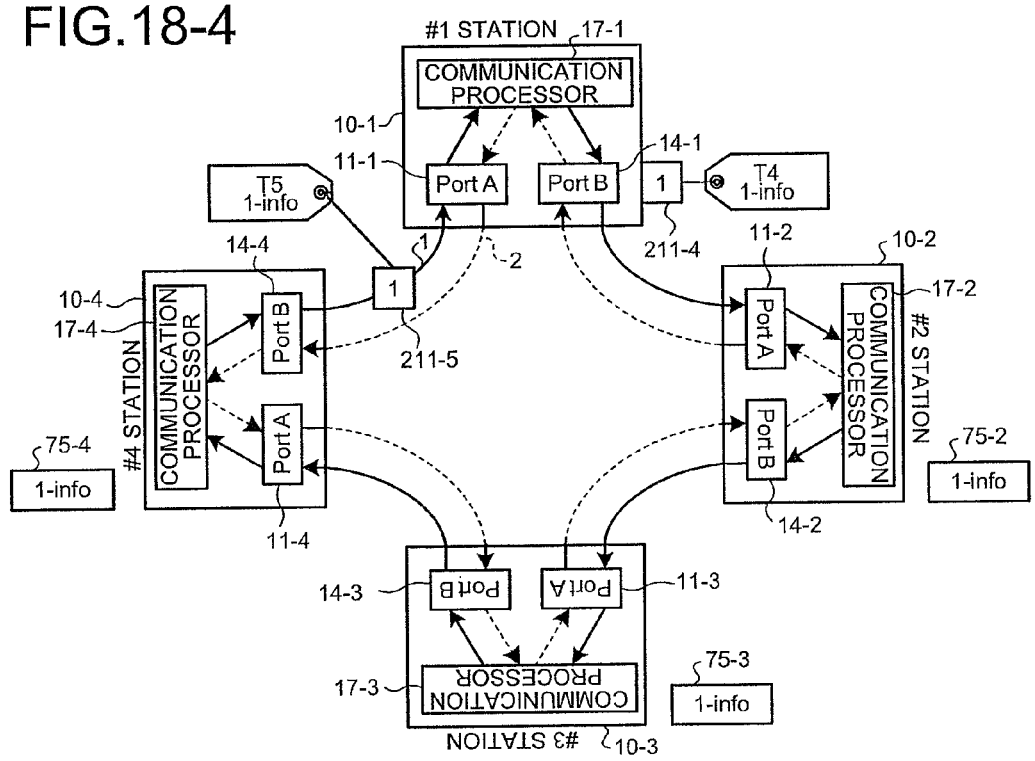

COMMUNICATION NODE, AND RING CONFIGURATION METHOD AND RING ESTABLISHMENT METHOD IN COMMUNICATION SYSTEM

TECHNICAL FIELD

The present invention relates to a communication node used in an Ethernet (registered trademark)-base ring communication system communicating an Ethernet (registered trademark) in the shape of a ring, a ring configuration method and a ring establishment method in the communication system that allows masterless token ring communication in the communication system.

BACKGROUND ART

There is conventionally known a topology in which a network is constructed by connecting between communication terminals (hereinafter, "communication nodes") using FDDI (Fiber-Distributed Data Interface) (for example, Nonpatent literature 1). In the FDDI, generally, a network is constructed so that communication nodes are connected in a ring. The network using the FDDI is formed of a dual-loop structure having a first loop in which data is transmitted in a normal state, and a second loop which is configured so as to enable communication using a normal portion, when abnormality such as disconnection of a cable forming the first loop and failure in a communication node occurs, by performing loop-back so as to disconnect an abnormal portion from the network.

Further, the FDDI employs a token passing system that provides controls so that collisions of data transmitted between communication nodes connected to the network do not occur by using data for the right to transmit called a token. The token passing system is implemented in such a manner that a token is passed around the first loop, and a communication node wishing to transmit data takes the token, passes data instead that the communication node itself wishes to transmit, and releases the token again to the network when the transmission is finished, so that only one terminal can use the cable at a time.

Nonpatent literature 1: "Details of FDDI Technology-Construction of 100 Mbps LAN-" written by Karl F. Pieper, William J. Cronin Jr., and Wendy H. Michael, translated and supervised by Naoki Mizutame, first edition, published by Kyoritsu Shuppan Co., Aug. 30, 1993, p. 67 to 73.

DISCLOSURE OF INVENTION

Problem to be Solved by the Invention

Currently, however, a configuration in which a network is constructed by connecting between communication nodes using Ethernet (registered trademark) is widely used. The Ethernet (registered trademark) employs a CSMA/CD (Carrier Sense Multiple Access/Collision Detection) system that gets communication right while avoiding collisions, when the communication node connected to the Ethernet (registered trademark) transmits data, and propagates the data to all the connected communication nodes. To function the system, a connection configuration of the communication nodes in the Ethernet (registered trademark) includes two topologies such as a bus topology constructed by extending branch cables, from one cable which is a mainline, provided at appropriate intervals to arrange a plurality of communication nodes thereat, and a star topology constructed by radially arranging a plurality of communication nodes around one control unit (hub).

However, the Ethernet (registered trademark) is a system in which terminal devices connected to the network perform termination (discard) of Ethernet (registered trademark) frames so that the bus topology and the star topology is can be used but there is a problem that the ring topology cannot be used. Moreover, the star topology has a problem that if a failure occurs in a repeater (hub), none of the communication nodes connected to the repeater can perform communications, or communication messages are disadvantageously concentrated on the repeater so that the repeater becomes a bottle neck of communication performance. Furthermore, in the topology of the conventional Ethernet (registered trademark) collision and congestion can occur, which makes it difficult to ensure punctuality.

In addition, when the network is established, it is necessary to transfer station information from each communication node to all the other communication nodes on the network so that all the communication nodes can recognize the configuration of the network. After that, it was necessary for the source of transmission of the station information to perform a process of receiving a response from all the other communication nodes to check whether the station information has properly reached to all the communication nodes on the network; however, there was a problem that this process was complicated.

Although the FDDI is available as the ring topology, at present, however, networks using the FDDI are not as widespread as networks using the Ethernet (registered trademark). Even if the network using the Ethernet (registered trademark) is configured in the ring topology, there is a problem that the specification of the FDDI cannot be applied, as it is, to the Ethernet (registered trademark).

The present invention has been made in view of the above discussion, and it is an object of the present invention to obtain a communication node used in an Ethernet (registered trademark)-base ring communication system in which communication nodes are connected by Ethernet (registered trademark) without using a repeater. It is another object of the present invention to obtain communication nodes capable of easily configuring a ring from which a failure is eliminated when the failure is found in the ring topology network constructed by the Ethernet (registered trademark), and obtain a ring configuration method in the communication system.

It is still another object of the present invention to obtain a channel establishment method in the ring communication system that defines a procedure required to perform communications between communication nodes in the Ethernet (registered trademark)-base ring communication system. More specifically, it is still another object of the present invention to obtain a communication node capable of checking whether channels formed with normal communication nodes are configured in a ring, and obtain a ring establishment method in the communication system in the Ethernet (registered trademark)-base ring communication system.

It is still another object of the present invention to obtain a communication node capable of easily checking whether station information has properly reached to all the communication nodes on the network after the ring is established in the Ethernet (registered trademark)-base ring communication system, and obtain a ring establishment method in the communication system.

Means for Solving Problem

To achieve the above object, there is provided a communication node that forms a communication system in which a plurality of communication nodes are connected in a ring, the communication nodes being one-to-one connected to each other by Ethernet (registered trademark) which is duplicated with a normal-system ring that transmits a frame when a communication state is normal and with a standby-system ring used for transmission of a frame when the communication state is abnormal, the communication node including a first port that includes an input unit for the normal-system ring and an output unit for the standby-system ring; a second port that includes an output unit for the normal-system ring and an input unit for the standby-system ring; and a communication processor that performs a process of receiving a frame output from the output unit of the normal-system ring in the second port and a process of transmitting the frame from the output unit of the normal-system ring in the second port upon normal communication, and performs, when other communication node performs a loop-back process due to communication abnormality, only a process of forwarding a frame input from the input unit of the standby-system ring in the second port without receiving the frame, and performs a process of transmitting the frame from the output unit of the standby-system ring in the first port.

Effect of the Invention

According to the present invention, by connecting the communication nodes in a ring, there is no need to use the repeater required for a connection configuration of the star topology or the bus topology, and thus it is possible to eliminate the state in which all the communication nodes cannot perform communications due to occurrence of a failure in the repeater and to avoid any situation in which communication messages are concentrated on the repeater. Moreover, the repeater can be removed, and this allows cost reduction when the system is constructed.

BRIEF DESCRIPTION OF DRAWINGS

FIG. 6-1 is a diagram schematically showing an example of a procedure of a ring-establishment check process in the ring communication system (part 1).

FIG. 6-2 is a diagram schematically showing an example of a procedure of a ring-establishment check process in the ring communication system (part 2).

FIG. 6-3 is a diagram schematically showing an example of a procedure of a ring-establishment check process in the ring communication system (part 3).

FIG. 6-4 is a diagram schematically showing an example of a procedure of a ring-establishment check process in the ring communication system (part 4).

FIG. 6-5 is a diagram schematically showing an example of a procedure of a ring-establishment check process in the ring communication system (part 5).

FIG. 6-6 is a diagram schematically showing an example of a procedure of a ring-establishment check process in the ring communication system (part 6).

FIG. 8-1 is a diagram schematically showing an example of a procedure of a discard process of a ring-establishment check frame (part 1).

FIG. 8-2 is a diagram schematically showing an example of a procedure of a discard process of a ring-establishment check frame (part 2).

FIG. 8-3 is a diagram schematically showing an example of a procedure of a discard process of a ring-establishment check frame (part 3).

FIG. 8-4 is a diagram schematically showing an example of a procedure of a discard process of a ring-establishment check frame (part 4).

FIG. 9-1 is a diagram showing an example of received-frame information held by a #4 station in the situation shown in FIG. 8-1.

FIG. 9-2 is a diagram showing an example of received-frame information held by a #1 station in the situation shown in FIG. 8-1.

FIG. 10-1 is a diagram schematically showing an example of a procedure of a check process for a connection configuration of a new ring formed after loop-back occurs (part 1).

FIG. 10-2 is a diagram schematically showing an example of a procedure of a check process for a connection configuration of a new ring formed after loop-back occurs (part 2).

FIG. 10-3 is a diagram schematically showing an example of a procedure of a check process for a connection configuration of a new ring formed after loop-back occurs (part 3).

FIG. 10-4 is a diagram schematically showing an example of a procedure of a check process for a connection configuration of a new ring formed after loop-back occurs (part 4).

FIG. 10-5 is a diagram schematically showing an example of a procedure of a check process for a connection configuration of a new ring formed after loop-back occurs (part 5).

FIG. 11-1 is a diagram showing a status causing a problem that may possibly occur during the ring-establishment check process (part 1).

FIG. 11-2 is a diagram showing a status causing a problem that may possibly occur during the ring-establishment check process (part 2).

FIG. 11-3 is a diagram showing a status causing a problem that may possibly occur during the ring-establishment check process (part 3).

FIG. 13-1 is a diagram schematically showing an example of a procedure of a ring-establishment check process when a new communication node is added to the ring in place of a disconnected communication node (part 1).

FIG. 13-2 is a diagram schematically showing an example of a procedure of a ring-establishment check process when the new communication node is added to the ring in place of the disconnected communication node (part 2).

FIG. 14-1 is a diagram schematically showing an example of a procedure of a discard process of a ring-establishment check frame passing around the standby-system ring (part 1).

FIG. 14-2 is a diagram schematically showing an example of a procedure of a discard process of a ring-establishment check frame passing around the standby-system ring (part 2).

FIG. 14-3 is a diagram schematically showing an example of a procedure of a discard process of a ring-establishment check frame passing around the standby-system ring (part 3).

FIG. 14-4 is a diagram schematically showing an example of a procedure of a discard process of a ring-establishment check frame passing around the standby-system ring (part 4).

FIG. 14-5 is a diagram schematically showing an example of a procedure of a discard process of a ring-establishment check frame passing around the standby-system ring (part 5).

FIG. 14-6 is a diagram schematically showing an example of a procedure of a discard process of a ring-establishment check frame passing around the standby-system ring (part 6).

FIG. 16-1 is a diagram schematically showing an example of a procedure of deleting a frame unrelated to the ring-establishment check process (part 1).

FIG. 16-2 is a diagram schematically showing an example of a procedure of deleting a frame unrelated to the ring-establishment check process (part 2).

FIG. 16-3 is a diagram schematically showing an example of a procedure of deleting a frame unrelated to the ring-establishment check process (part 3).

FIG. 16-4 is a diagram schematically showing an example of a procedure of deleting a frame unrelated to the ring-establishment check process (part 4).

FIG. 16-5 is a diagram schematically showing an example of a procedure of deleting a frame unrelated to the ring-establishment check process (part 5).

FIG. 18-1 is a diagram schematically showing an example of a procedure of a station-information notification process in the ring communication system (part 1).

FIG. 18-2 is a diagram schematically showing an example of a procedure of a station-information notification process in the ring communication system (part 2).

FIG. 18-3 is a diagram schematically showing an example of a procedure of a station-information notification process in the ring communication system (part 3).

FIG. 18-4 is a diagram schematically showing an example of a procedure of a station-information notification process in the ring communication system (part 4).

FIG. 18-5 is a diagram schematically showing an example of a procedure of a station-information notification process in the ring communication system (part 5).

FIG. 18-6 is a diagram schematically showing an example of a procedure of a station-information notification process in the ring communication system (part 6).

Figure 1:
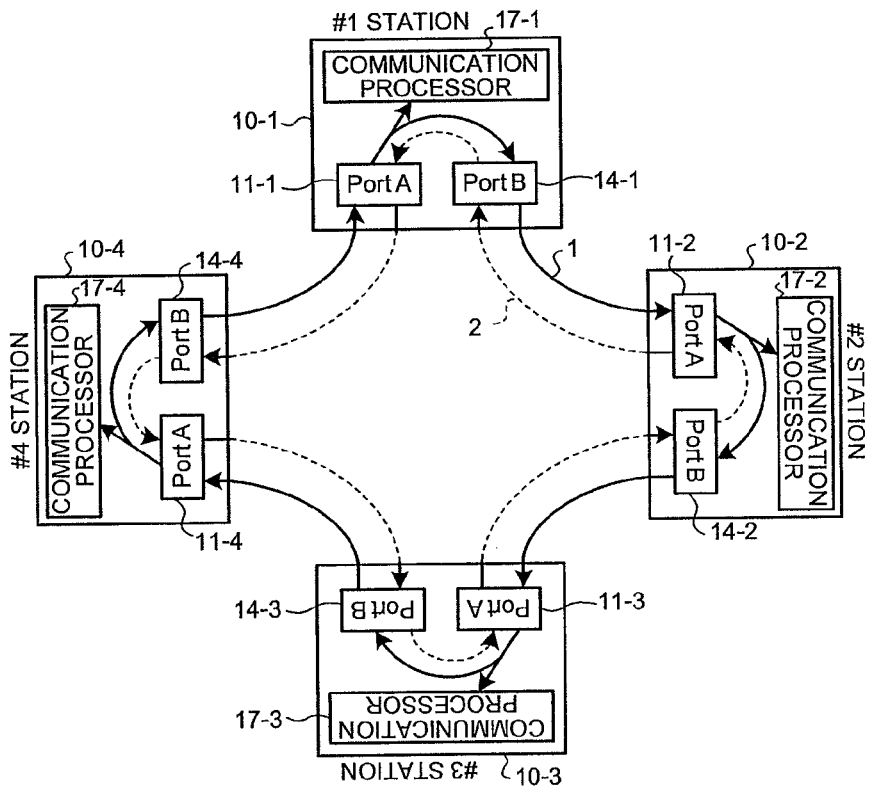
FIG. 1 is a diagram schematically showing a rough configuration of an Ethernet (registered trademark)-base ring communication system according to the present invention.

EXPLANATIONS OF LETTERS OR NUMERALS 1 normal-system ring
2 standby-system ring
10, 10-1 to 10-5 communication node
11, 11-1 to 11-5 A port
14, 14-1 to 14-5 B port
17, 17-1 to 17-5 communication processor
20 ring-establishment check processor
21 ring-establishment check-frame issuing unit
22, 72 frame-circulation-time calculating unit
23, 73 frame-circulation-time storage unit
24 ring-establishment determining unit
31 received-frame-information management unit
32 received-frame-information storage unit
51 loop-back-state control unit
61 frame discard processor
71 station-information management unit
74 station-information notification-completion determining unit
75 network-configuration-information storage unit

BEST MODE(S) FOR CARRYING OUT THE INVENTION

Exemplary embodiments of a ring configuration method and a ring establishment method in the communication system according to the present invention are explained in detail below with reference to the accompanying drawings. The present invention is by no means limited by these embodiments. In the following, the overview of the configuration of the present invention common to the embodiments is explained, and thereafter, each of the embodiments is explained.

FIG. 1 is a diagram schematically showing a rough configuration of an Ethernet (registered trademark)-base ring communication system according to the present invention. The ring communication system is constructed by connecting a plurality of communication nodes (communication devices, described as nodes in the figure) 10-1 to 10-4 in the shape of a ring, the communication nodes being one-to-one connected to each other by the Ethernet (registered trademark). Here, an Ethernet (registered trademark) cable connecting between the communication nodes 10-1 to 10-4 is physically duplicated with two rings of a normal-system ring 1, indicated by solid line in the figure, that carries a frame in the clockwise in the ring communication system, and of a standby-system ring 2, indicated by dotted line, that carries a frame in the counterclockwise. The normal-system ring 1 is a ring used when the communication nodes 10-1 to 10-4 and the cable that form the ring communication system are in the normal state. The standby-system ring 2 is a ring used to separate, when abnormality occurs in any one of the communication nodes 10-1 to 10-4 and the cable forming the ring communication system, an abnormal portion from the system by a loop back process, which is explained later.

Figure 2:
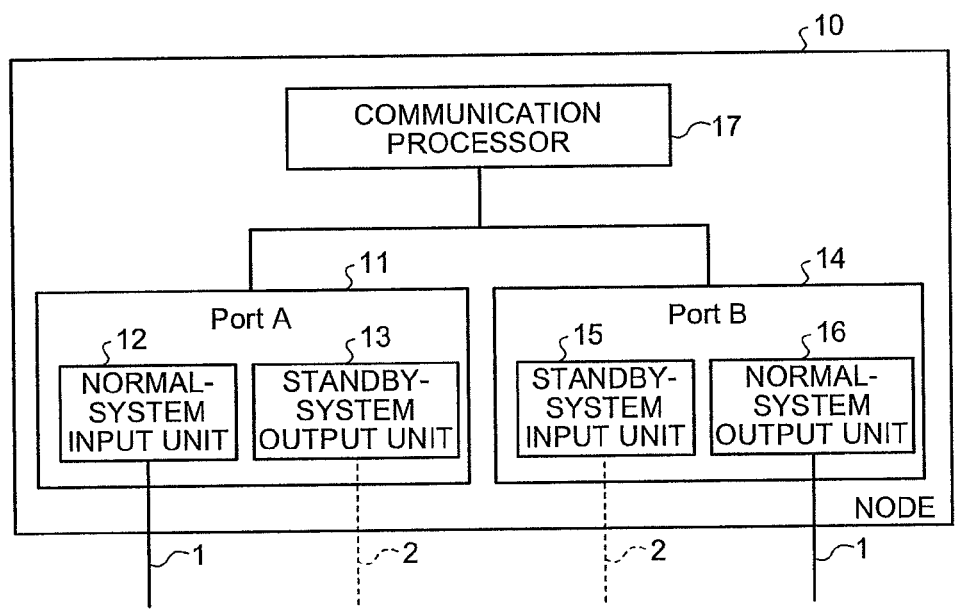
FIG. 2 is a block diagram schematically showing a configuration of a communication node that forms the ring communication system of FIG. 1.

FIG. 2 is a block diagram schematically showing a configuration of an arbitrary communication node 10 in the ring communication system of FIG. 1. The communication node 10 includes two ports 11 and 14 for connecting an Ethernet (registered trademark) cable to neighboring communication nodes, and a communication processor 17 that processes frames received from the ports 11 and 14, and establishes a channel between other communication nodes.

The ports include two ports: A port (Port A in the figure) 11 and B port (Port B in the figure) 14. The A port 11 includes a normal-system input unit 12 that receives a frame through the normal-system ring 1 and a standby-system output unit 13 that transmits a frame to the standby-system ring 2. The B port 14 includes a normal-system output unit 16 that transmits a frame to the normal-system ring 1 and a standby-system input unit 15 that receives a frame through the standby-system ring 2. It is noted that the A port 11 corresponds to "first port" in claims and the B port 14 corresponds to "second port" therein.

The communication processor 17 reads the frame which is input through the normal-system ring 1 and received by the normal-system input unit of the A port 11, and transmits the frame from the normal-system output unit of the B port 14 to the normal-system ring 1 after a predetermined process is performed thereon if necessary. Meanwhile, the communication processor 17 does not read the frame which is input through the standby-system ring 2 and received by the standby-system input unit of the B port 14, and transmits the frame as it is to the standby-system output unit of the A port 11. More specifically, the communication processor 17 performs a predetermined process only on the frame to be output from the B port 14 if necessary in the normal state, but does not perform any process on the frame, to be passed from the B port 14 to the A port 11 in the communication node.

Communications in the normal state in the Ethernet (registered trademark)-base ring communication system are performed in the normal-system ring 1 using a token frame with which each of the communication nodes 10-1 to 10-4 acquires a communication right. The communication node 10 wishing to perform communication receives a token frame passing around the normal-system ring 1 at the normal-system input unit 12 of the A port 11 to acquire the communication right. The communication node 10 having acquired the communication right transmits a transmission-target data frame, instead of the token frame, from the normal-system output unit 16 of the B port 14 to the normal-system ring 1. When the transmission of the data frame is finished, the communication node 10 returns the token frame from the normal-system output unit 16 of the B port 14 to the normal-system ring 1, and returns to the state in which other communication nodes 10 can perform communication.

That is the overview of the Ethernet (registered trademark)-base ring communication system and it is common to the embodiments explained below. The respective embodiments will be explained below based on this overview. It is noted that the communication nodes 10-1, 10-2, 10-3, and 10-4 are described as #1 station, #2 station, #3 station, and #4 station, respectively, in the following explanation.

For simplification of explanation, the present specification explains a case as an example where the ring communication system is formed of the four communication nodes 10-1 to 10-4, however, the following embodiments can be applied to a case in which more than two communication nodes 10 are connected in a ring using the Ethernet (registered trademark).

First Embodiment

A first embodiment according to the present invention explains a loop-back process when a failure, or an improper connection, of a cable occurs in a part of the Ethernet (registered trademark)-base ring communication system as shown in FIG. 1.

<When Failure Occurs>

Figure 3:
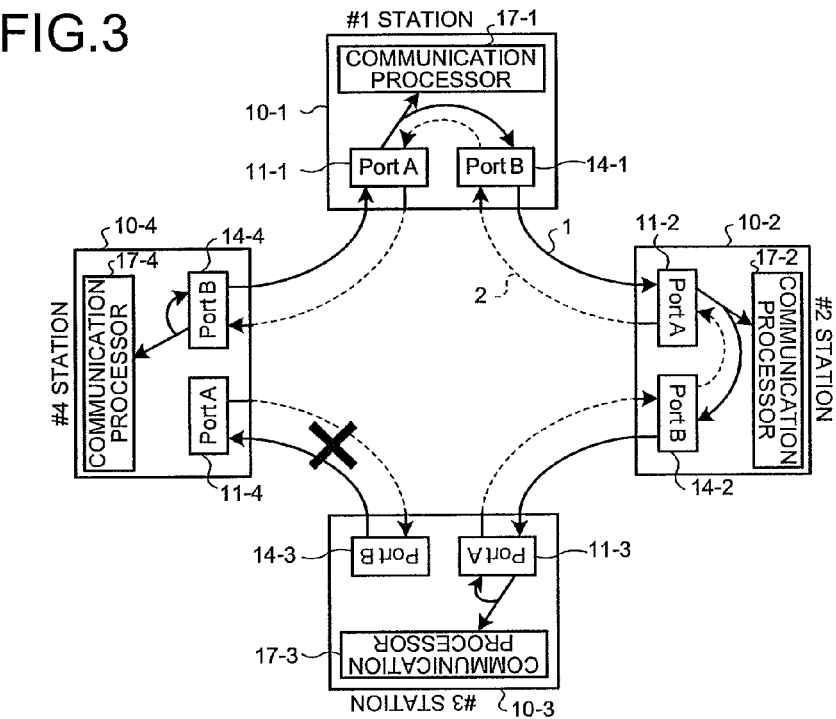
FIG. 3 is a diagram schematically showing a situation in which a failure has occurred in the ring communication system.

FIG. 3 is a diagram schematically showing a situation in which a failure has occurred in the ring communication system. It is assumed that, while communication is being normally performed using the normal-system ring 1 in the network in which the communication nodes 10-1 to 10-4 of the #1 station to #4 station are connected in a ring as shown in FIG. 1, the cable between the #3 station 10-3 and the #4 station 10-4 is disconnected as shown in FIG. 3. In this case, a communication processor 17-4 of the #4 station 10-4 determines that a failure has occurred in the cable connected to the #3 station 10-3 by detecting that a state where an A port 11-4 of the #4 station 10-4 does not receive a signal from the #3 station 10-3 is continued for a predetermined time or more, and performs loop-back to connect between the standby-system input unit and the normal-system output unit in a B port 14-4. Here, all the communication nodes (stations) 10-1 to 10-4 that form the ring communication system have the same reference parameter to determine to determine whether a failure has occurred based on the time during which the frame is not received. Therefore, the #4 station 10-4 that is located closest to the failure part in the normal-system ring 1 will be the station that will first detect the failure in the cable between the #3 station 10-3 and the #4 station 10-4. Consequently, the #4 station 10-4 performs the loop-back process. Then, the #4 station 10-4 transmits an abnormality notification signal indicating occurrence of the disconnection of the cable between the #3 station 10-3 and the #4 station 10-4. A communication processor 17-3 of the #3 station 10-3 receives the abnormality notification signal and comes to know that the cable is disconnected between the #3 station 10-3 and the #4 station 10-4, and performs loop-back to connect between the normal-system input unit and the standby-system output unit in an A port 11-3 so as not to output the frame to a B port 14-3.

Thus, the #3 station 10-3 and the #4 station 10-4 perform loop-back on the transmission channel by reconfiguring a new ring with the standby-system ring 2, so that the cable in the failure part between #3 station 10-3 and the #4 station 10-4 is not used, and, thereafter, communications between the stations are restarted. In the subsequent processes, the communication processor 17-3 of the #3 station 10-3 performs the processes of once loading a frame received from the normal-system ring 1 by the normal-system input unit of the A port 11-3, performing a predetermined process on the frame, and then outputting the frame from the standby-system output unit of the same A port 11-3 to the standby-system ring 2, while the communication processor 17-4 of the #4 station 10-4 performs the processes of once loading the frame received from the standby-system ring 2 by the standby-system input unit of the B port 14-4, performing a predetermined process on the frame, and then transmitting the frame to the normal-system output unit of the same B port 14-4.

Although the loop-back is explained in FIG. 3 using the example of the cable disconnection between the #3 station 10-3 and the #4 station 10-4, the ring is reconfigured in the similar manner even when the cable is disconnected in any other part or even when a failure occurs in any one of the communication nodes (stations) 10-1 to 10-4.

<When Ethernet (Registered Trademark) Cable is Improperly Connected>

Figure 4:
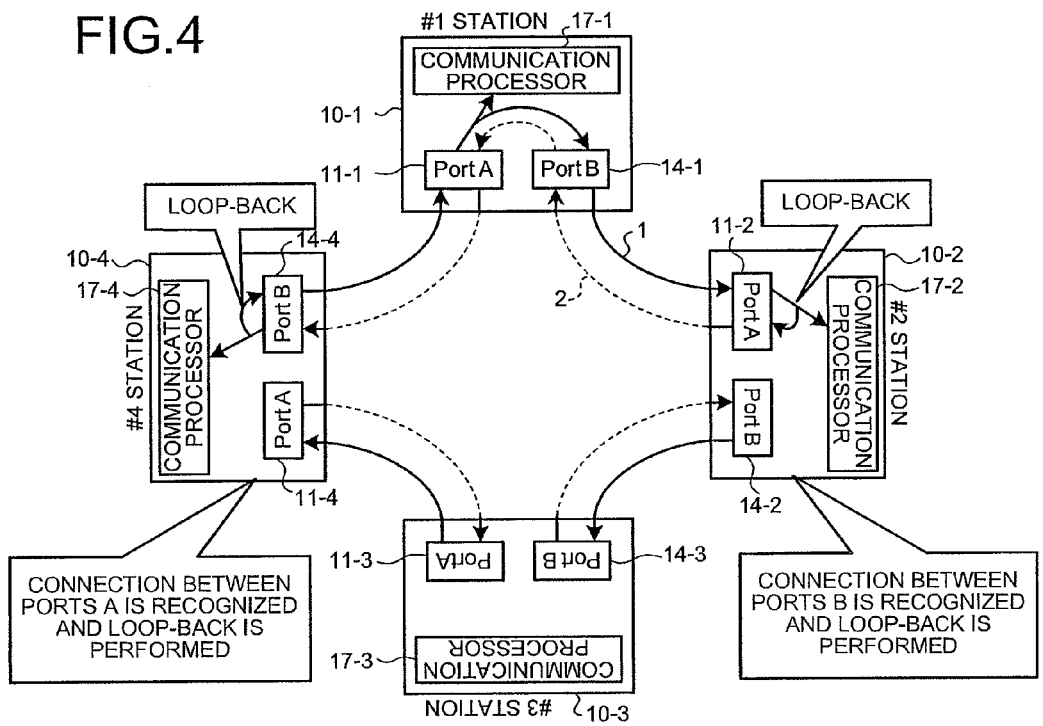
FIG. 4 is a diagram schematically showing a situation in which cables have been improperly connected to each port upon ring configuration in the ring communication system.

FIG. 4 is a diagram schematically showing a situation in which cables have been improperly connected to each port upon ring configuration in the ring communication system. First, it is assumed that the cables and each of the ports in the #3 station 10-3 are improperly connected as shown in FIG. 4 during the operation of connecting between the communication nodes 10-1 to 10-4 with cables. Specifically, it is assumed that a B port 14-2 of the #2 station 10-2 and the B port 14-3 of the #3 station 10-3 are connected and that the A port 11-4 of the #4 station 10-4 and the A port 11-3 of the #3 station 10-3 are connected by mistake.

After the connection of the cable is completed, each of the communication processors 17-1 to 17-4 of the communication nodes 10-1 to 10-4 checks, by negotiation performed based on a predetermined rule, whether the connection ports of the own communication node are successfully connected to the connection ports of the neighboring communication nodes, specifically, whether the A port 11 of the own communication node is connected to the B port 14 of the neighboring communication node and the B port 14 of the own communication node is connected to the A port 11 of the neighboring communication node. At this time, the communication processor 17-2 of the #2 station 10-2 learns through the negotiation that its B port 14-2 has been connected to the B port 14-3 of the #3 station 10-3, and recognizes that the connection port connected to the #3 station 10-3 is incorrect. Likewise, the communication processor 17-4 of the #4 station 10-4 learns through the negotiation that its A port 11-4 has been connected to the A port 11-3 of the #3 station 10-3, and recognizes that the connection port connected to the #3 station 10-3 is incorrect.

The communication processor 17 of the communication node that recognizes the improper connection to the connection port performs a loop-back process on the port that is not improperly connected. That is, the communication processor 17-2 of the #2 station 10-2 performs loop-back at the A port 11-2, and the communication processor 17-4 of the #4 station 10-4 performs loop-back at the B port 14-4.

Thus, a ring is configured by disconnecting the #3 station 10-3 being a cause of the improper connection from the ring. Thereafter, the normal communication is implemented through this ring.

According to the first embodiment, even when a failure occurs in the communication node 10 and the cable that form the ring communication system, the failure part can be disconnected by performing the loop-back, and thus the first embodiment has an effect that a highly reliable fault-tolerance ring communication system can be achieved. Furthermore, by connecting the communication nodes 10 in a ring, there is no need to use the repeater required for a connection configuration of the star topology or the bus topology, and thus it is possible to eliminate an awkward situation in which none of the communication nodes can perform communications due to occurrence of a failure of the repeater and to avoid events in which communication messages are concentrated on the repeater. Moreover, the first embodiment has another effect that the repeater can be removed, which allows reduction of costs at the time of system construction. The first embodiment has still another effect that an improper connection having occurred at the time of network construction can be found and a portion of the improper connection can be disconnected, which enables system construction to be facilitated.

Second Embodiment

A second embodiment of the present invention will explain a method of checking a connection configuration of a ring that is performed after the ports of the communication nodes are correctly connected to each other with the Ethernet (registered trademark) cable. For example, after the #1 station 10-1 to #4 station 10-4 are successfully connected to each other as shown in FIG. 1, the power to each communication node is turned on to configure the ring. At this time, it is expected that all the communication nodes 10-1 to 10-4 are simultaneously tuned on, but there can be an unexpected situation. For example, if the power supply system of the #3 station 10-3 is not working properly, the #3 station 10-3 will not start although its power is turned on. If the #3 station 10-3 does not start, the A port 11-2 of the #2 station 10-2 and the B port 14-4 of the #4 station 10-4 have to perform loop-back. Thus, a procedure of a ring-establishment check process for checking whether a ring channel is configured with the communication nodes 10-1 to 10-4 in the ring communication system immediately after the power to the communication nodes 10-1 to 10-4 is turned on is explained below.

Figure 5:
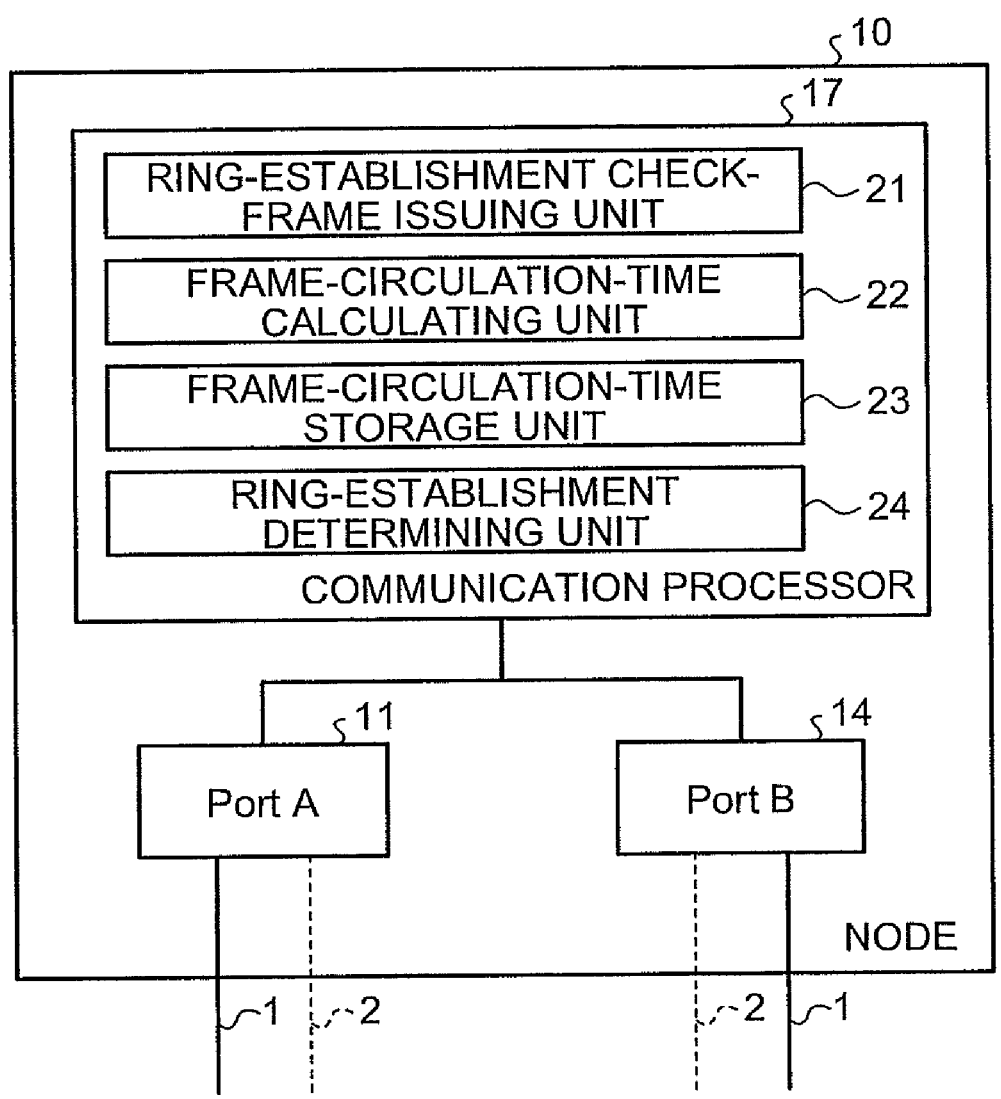
FIG. 5 is a block diagram schematically showing a functional configuration of a communication node according to a second embodiment of the present invention.

FIG. 5 is a block diagram schematically showing a functional configuration of a communication node according to the second embodiment. The communication processor 17 of the communication node 10 according to the second embodiment includes a ring-establishment check-frame issuing unit 21, a frame-circulation-time calculating unit 22, a frame-circulation-time storage unit 23, and a ring-establishment determining unit 24. It is noted that the same numerals are assigned to the same components as these in the explanation, and thus explanation thereof is omitted.

The ring-establishment check-frame issuing unit 21 issues a ring-establishment check frame for checking, at every predetermined time interval, whether a ring channel (hereinafter, simply called a ring) is established in the ring communication system after the power is turned on. A time of issuing the ring-establishment check frame is embedded in the ring-establishment check frame. Further, upon receiving the ring-establishment check frame issued by itself, the ring-establishment check-frame issuing unit 21 stops issuing subsequent ring-establishment check frames, and discards the received ring-establishment check frame.

The frame-circulation-time calculating unit 22 calculates a difference between a time of receiving the ring-establishment check frame and an issuance time embedded in the ring-establishment check frame when the ring-establishment check frame issued by the own communication node returns from the A port 11, determines a frame circulation time, which is a time in which the ring-establishment check frame circulates around the ring, and stores the time in the frame-circulation-time storage unit 23.

The ring-establishment determining unit 24 determines whether the state in which the ring-establishment check frame is not detected on the network has continued for the frame circulation time or more since the last reception of the ring-establishment check frame issued by the own communication node or by other communication node, and determines that all the communication nodes 10 have recognized the connection of the ring when the state has continued for the frame circulation time or more.

Figures 1, 6:
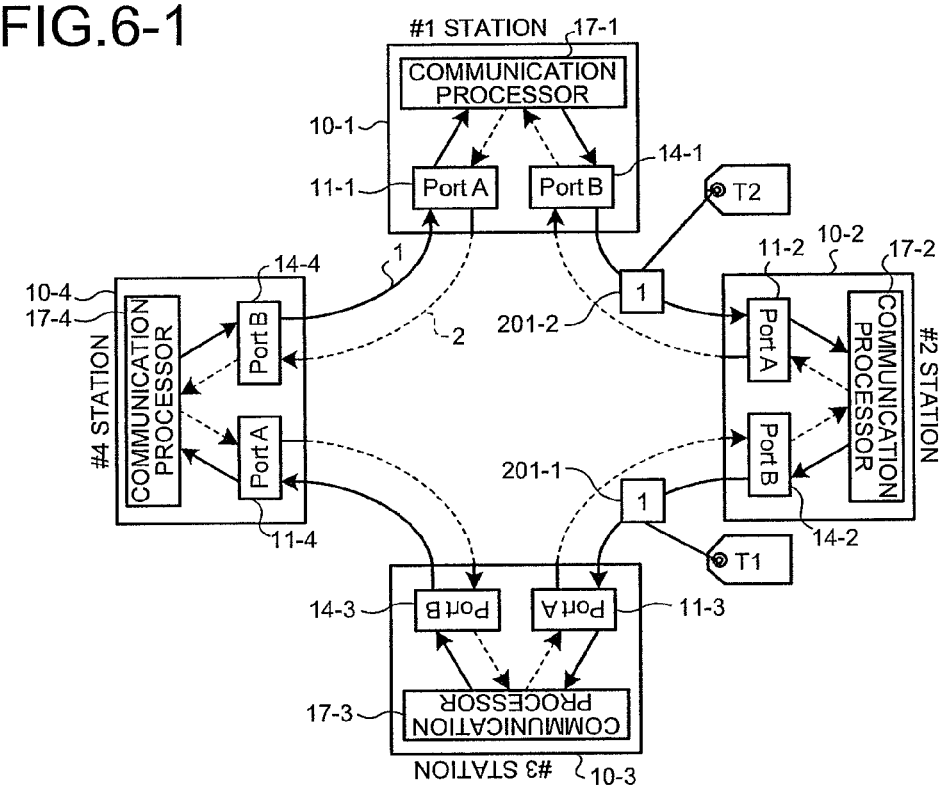
Figures 2, 6:
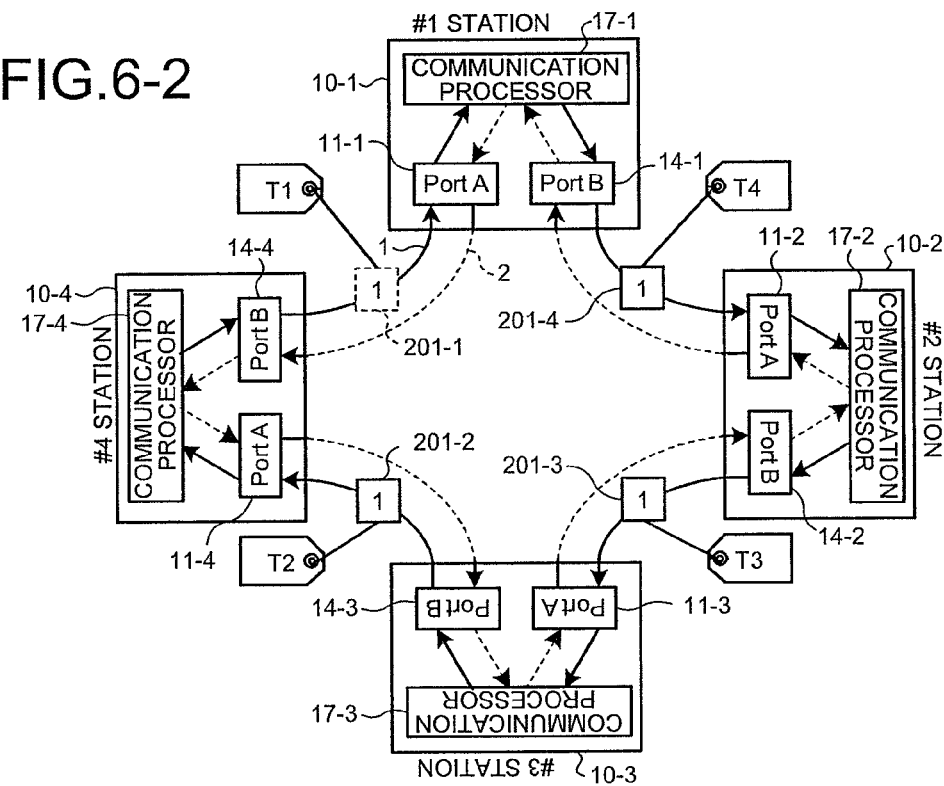
Figures 3, 6:
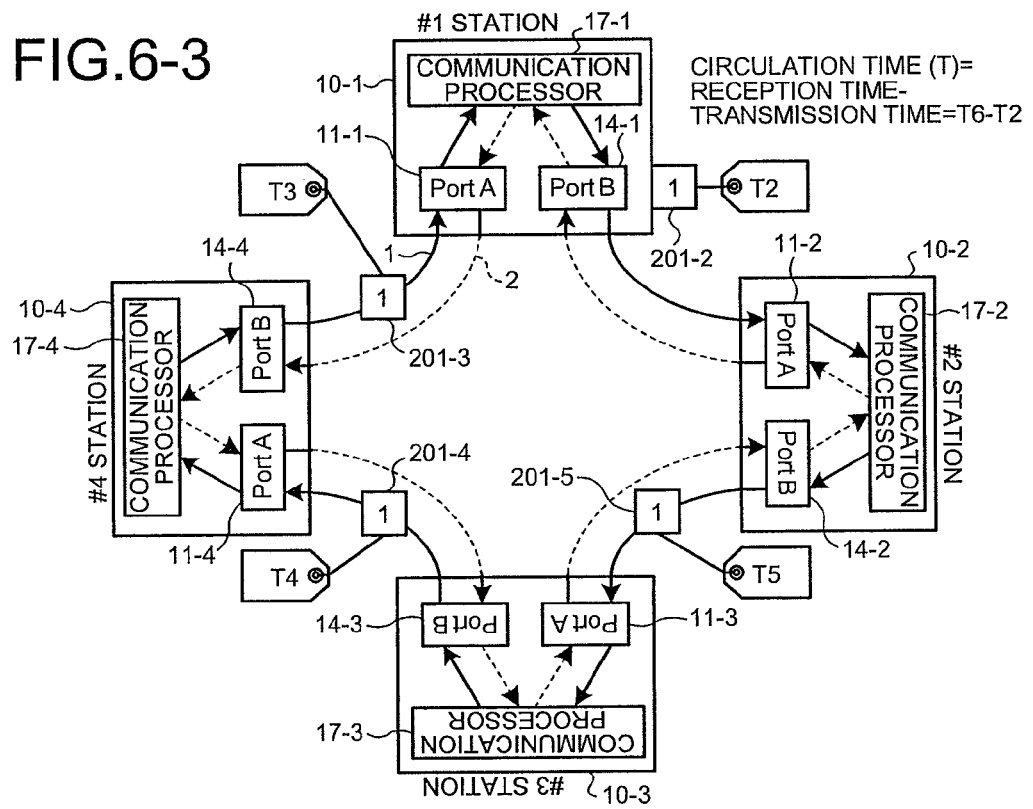
Figures 4, 6:
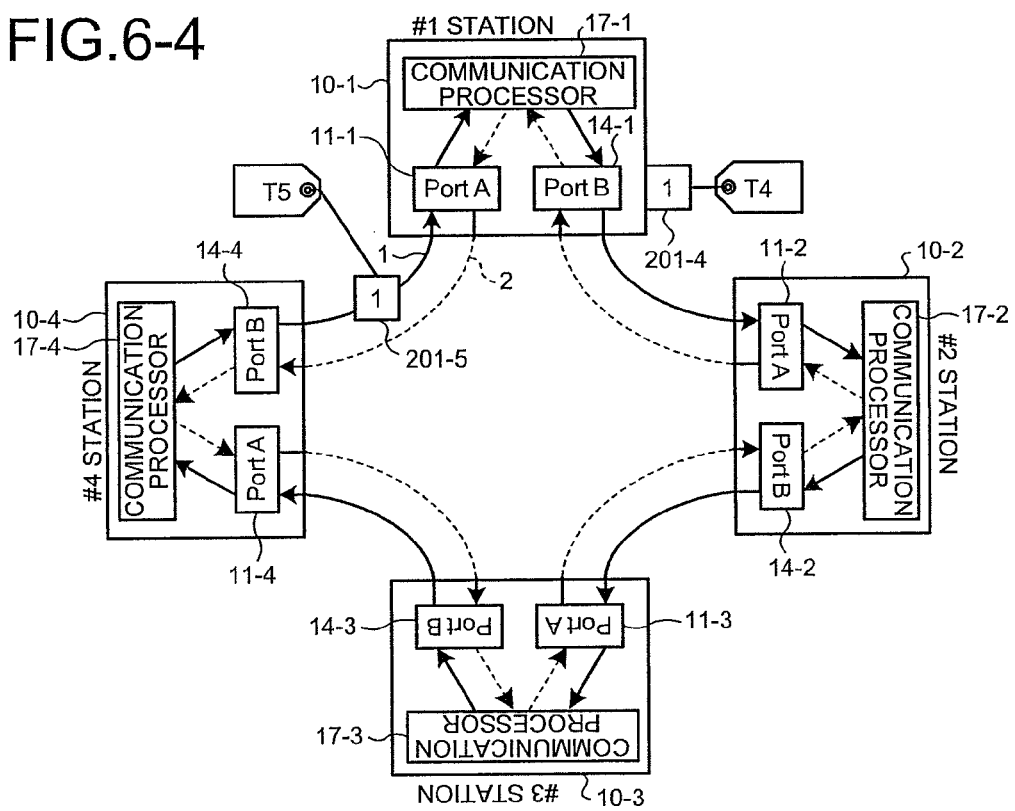
Figures 5, 6:
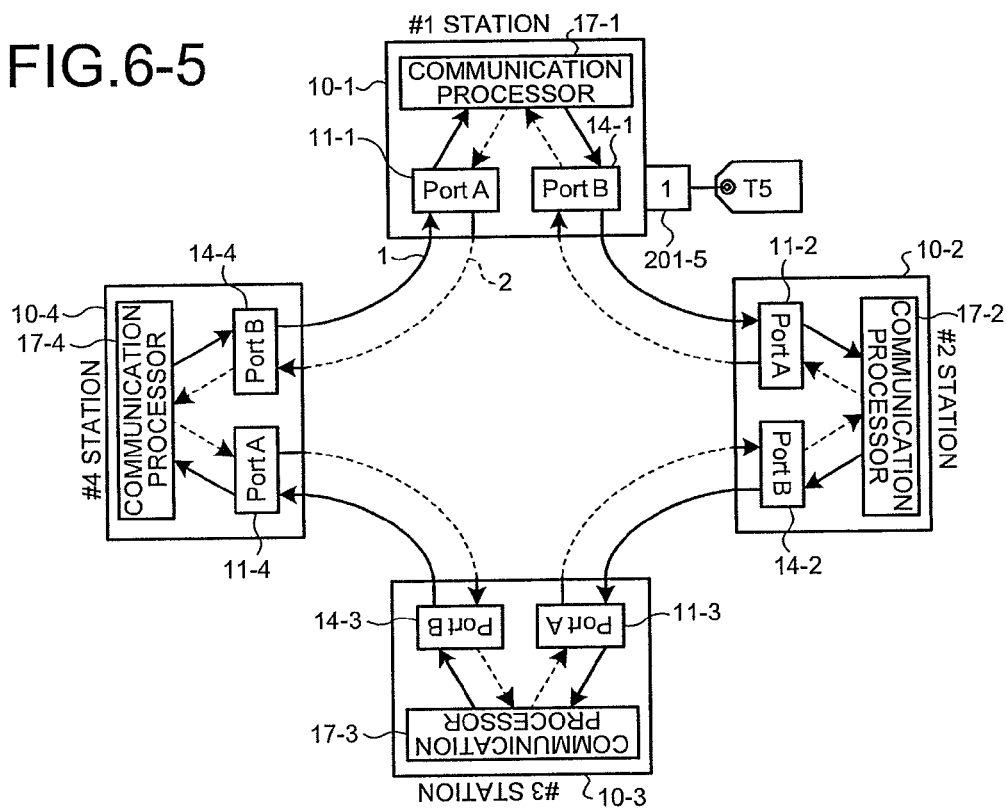
Figure 6:
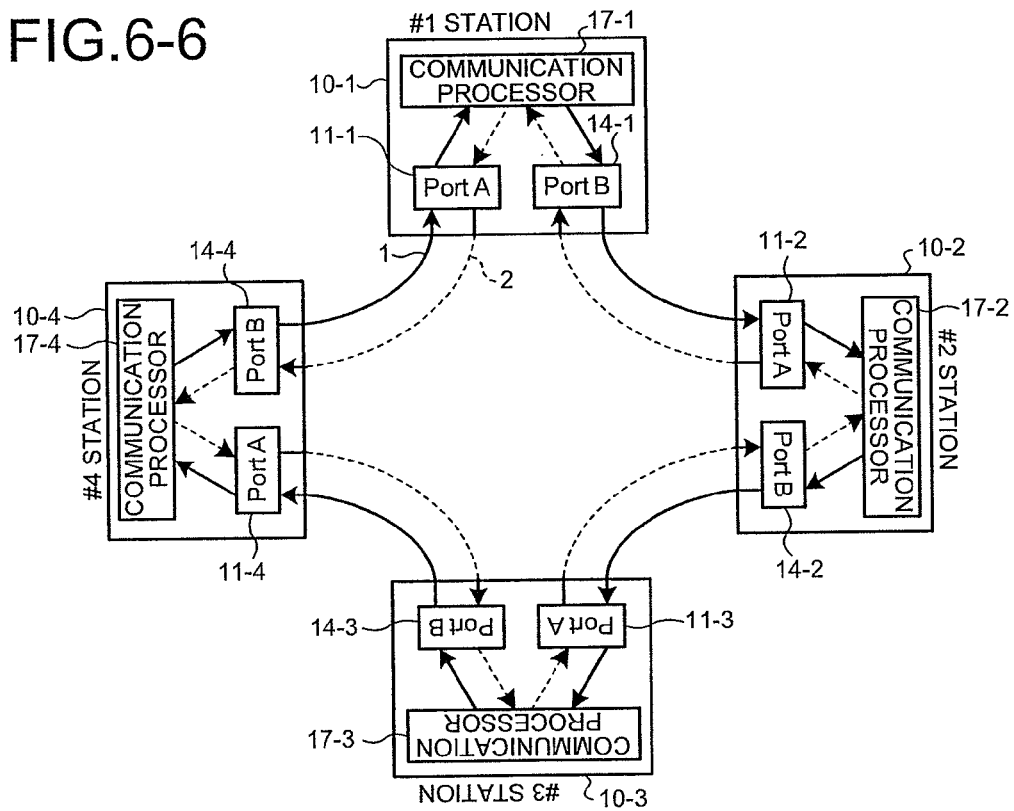

FIG. 6-1 to FIG. 6-6 are diagrams each schematically showing an example of a procedure of a ring-establishment check process in the ring communication system. First, the ring-establishment check-frame issuing unit 21 of the communication processor 17-1 in the #1 station 10-1 transmits the ring-establishment check frame with the issuance time embedded therein from the B port 14-1 to the normal-system ring 1 (FIG. 6-1). Here, it is assumed that the #1 station 10-1 transmits a first ring-establishment check frame 201-1 at a time T1 and transmits a second ring-establishment check frame 201-2 to the normal-system ring 1 at a time T2 when a predetermined time passes from the time T1.

Thereafter, the #1 station 10-1 does not receive the ring-establishment check frame sent by itself and, therefore, further transmits a third ring-establishment check frame 201-3 at a time T3 and a fourth ring-establishment check frame 201-4 at a time T4. Thereafter, it is assumed that the first ring-establishment check frame 201-1 first issued by the #1 station 10-1 is lost between the #4 station 10-4 and the #1 station 10-1 due to some reason (FIG. 6-2). It is noted that all the communication nodes 10-2 to 10-4 other than the #1 station 10-1 cause the ring-establishment check frames 201-1 to 201-4 sent by the #1 station 10-1 to pass as they are. Furthermore, the #1 station 10-1 does not receive the ring-establishment check frame sent by itself due to the loss of the first ring-establishment check frame 201-1 and, therefore, transmits a fifth ring-establishment check frame 201-5 to the normal-system ring at time T5.

Next, the #1 station 10-1 receives the second ring-establishment check frame 201-2 issued by itself from the A port 11-1, and stores a reception time T6 thereof. The frame-circulation-time calculating unit 22 of the communication processor 17-1 in the #1 station 10-1 calculates a frame circulation time T (=T6−T2) by subtracting the issuance time T2 embedded in the frame from the reception time T6 of the second ring-establishment check frame 201-2 (FIG. 6-3). The calculated frame circulation time is stored in the frame-circulation-time storage unit 23. The ring-establishment check-frame issuing unit 21 of the communication processor 17-1 in the #1 station 10-1 discards the returned second ring-establishment check frame 201-2 from the network. Furthermore, the ring-establishment check-frame issuing unit 21 of the communication processor 17-1 in the #1 station 10-1 first receives the ring-establishment check frame issued by itself and, therefore, stops issuing subsequent ring-establishment check frames (FIG. 6-4). It is noted that the #1 station 10-1 has issued up to the fifth ring-establishment check frame 201-5 by this time point.

Thereafter, the #1 station 10-1 performs the processes of sequentially receiving the ring-establishment check frames issued by the own station and discarding the received frames, and upon receiving and discarding the last issued fifth ring-establishment check frame 201-5, the ring-establishment check frames 201-1 to 201-5 issued by the #1 station 10-1 have been eliminated from the network (ring) (FIG. 6-5). The processes in FIG. 6-1 to FIG. 6-5 are simultaneously performed in the other #2 station 10-2 to #4 station 10-4.

When all the ring-establishment check frames 201-1 to 201-5 issued by the #1 station 10-1 are discarded from the network as shown in FIG. 6-5, the ring-establishment determining unit 24 of the communication processor 17-1 in the #1 station 10-1 starts counting whether absolutely no ring-establishment check frame passes through the network for the frame circulation time or more determined in FIG. 6-3. That is, the ring-establishment determining unit 24 sets the frame circulation time in a timer, and determines whether the ring-establishment check frames sent by the other communication nodes 10-2 to 10-4 are detected by the time the timeout occurs. During the determination, the ring-establishment determining unit 24 resets the timer each time the ring-establishment check frame sent by any one of the other communication nodes 10-2 to 10-4 is received. This is because the fact that establishment of the ring is checked not only by the own station but also by the other stations is obtained. If the state in which no ring-establishment check frame is observed on the network (ring) is continued for the frame circulation time T or more from the time the ring-establishment check frame is last observed, the ring-establishment determining unit 24 determines that all the other communication nodes 10-2 to 10-4 can also recognize the connection configuration of the network (establishment of the ring) (FIG. 6-6).

The above explanation stands for the case in which each station calculates the frame circulation time using a first returned ring-establishment check frame of the ring-establishment check frames issued by the own station. However, a configuration is allowable in which each station calculates circulation times of all the returned ring-establishment check frames and set an average value or a maximum value of these times as the frame circulation time in the timer.

According to the second embodiment, when the communication nodes are connected in the ring, the frame circulation time is calculated using the reception time and the issuance time of the ring-establishment check frame, and it is determined that all the communication nodes 10 on the network through which the frames are circulated can recognize the connection configuration of the ring when no ring-establishment check frame passes for the frame circulation time or more since the last passage of the ring-establishment check frame through the network, and thus the second embodiment has an effect that the frame circulation time can be set according to the number of communication nodes 10 connected in the ring. This case has an effect that this setting allows reduction in the time required for determination whether each communication node 10 recognizes the connection configuration of the network, as compared with a case in which, for example, a frame passage time per communication node is preset and a value is set as a timer set value, the value being obtained by multiplying the set value by the number of communication nodes 10 that form the ring communication system and by a safety factor to remove an error.

Third Embodiment

In the second embodiment, when a communication node that has issued a ring-establishment check frame receives the ring-establishment check frame issued itself, that communication node discards (terminate) the received frame. If a failure occurs in any one of the communication nodes and the communication node thereby drops (is disconnected) from the network in the middle of the ring-establishment check process according to the second embodiment, the loop-back is performed so as to eliminate the communication node, to configure a new ring. At this time, the ring-establishment check frame issued by the disconnected communication node may remain in the new ring. A third embodiment of the present invention will explain a method of handling this problem.

Figure 7:
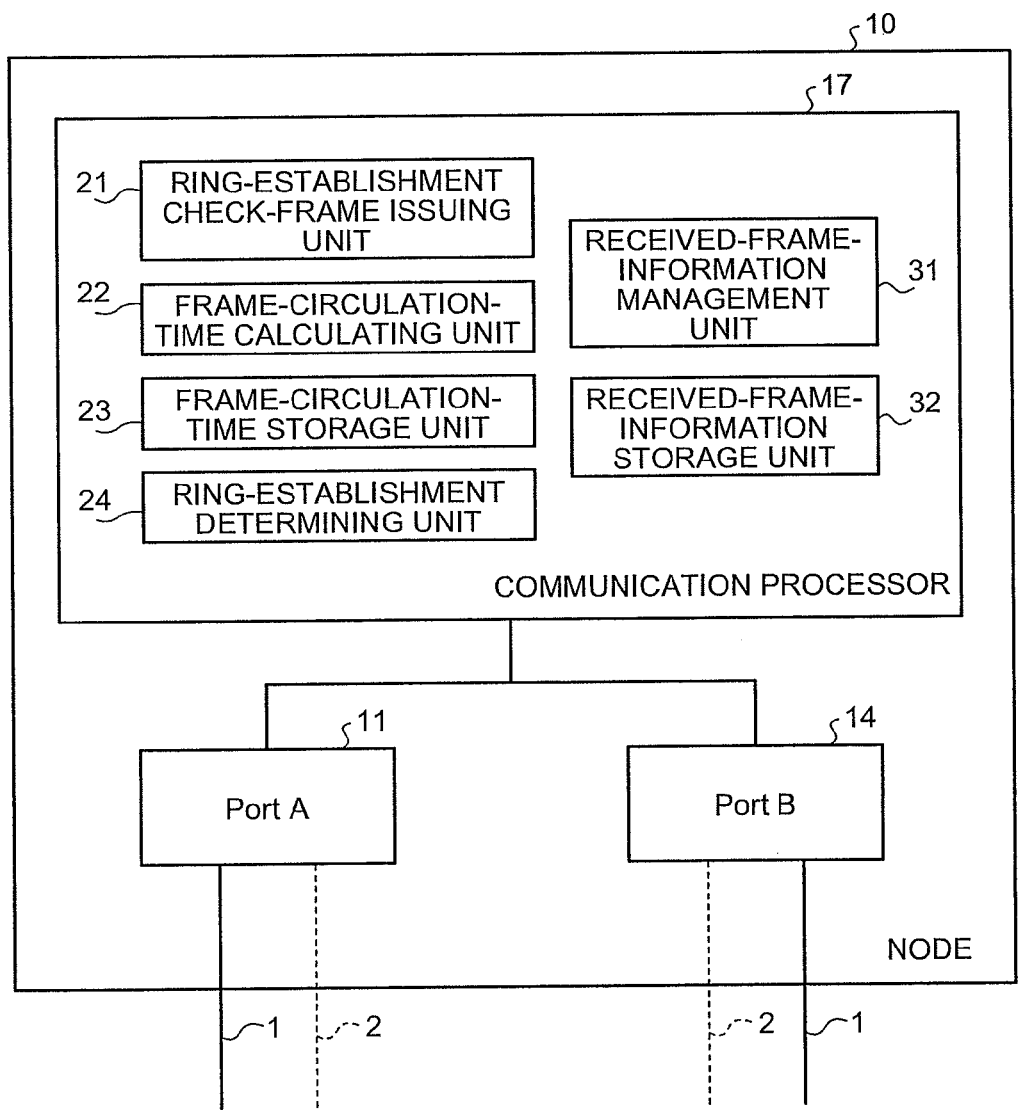
FIG. 7 is a block diagram schematically showing a functional configuration of a communication node according to a third embodiment of the present invention.

FIG. 7 is a block diagram schematically showing a functional configuration of a communication node according to the third embodiment. The communication processor 17 of the communication node of the third embodiment has a configuration in which the second embodiment shown in FIG. 5 further includes a received-frame-information management unit 31 and a received-frame-information storage unit 32.

Each time a ring-establishment check frame issued by other communication node 10 and received from the A port 11 is repeated, the received-frame-information management unit 31 acquires, for the ring-establishment check frame, a source communication node, frame identification information such as a serial number identifying the frame, and received-frame information containing an issuance time of the frame (or reception time of the frame), and checks the received-frame information against the received-frame information stored in the received-frame-information storage unit 32. When the received ring-establishment check frame is not the same as previously received one (namely, when it is a newly issued one), the received-frame-information management unit 31 overwrites and stores the received ring-establishment check frame as the received-frame information of the source communication node in the received-frame-information storage unit 32. Meanwhile, when the received ring-establishment check frame is the same as the previously received one, the received-frame-information management unit 31 discards the received ring-establishment check frame.

The received-frame-information storage unit 32 stores received-frame information for each communication node 10 connected to the network. For example, as explained in the second embodiment, when a communication node 10 receives ring-establishment check frames issued at every predetermined time interval, received-frame information for new ring-establishment check frames is sequentially overwritten because the new ring-establishment check frames have different serial numbers from each other (the number is incremented by one).

Moreover, the ring-establishment check-frame issuing unit 21 has a function of embedding the frame identification information such as the serial number identifying each frame in the ring-establishment check frame. When the frame identification information is the serial number, the ring-establishment check-frame issuing unit 21 performs the process of embedding the serial number incremented by one in each ring-establishment check frame issued at a predetermined time interval. It is noted that the same numerals are assigned to the same components as these in the explanation, and thus explanation thereof is omitted.

Figures 1, 8:
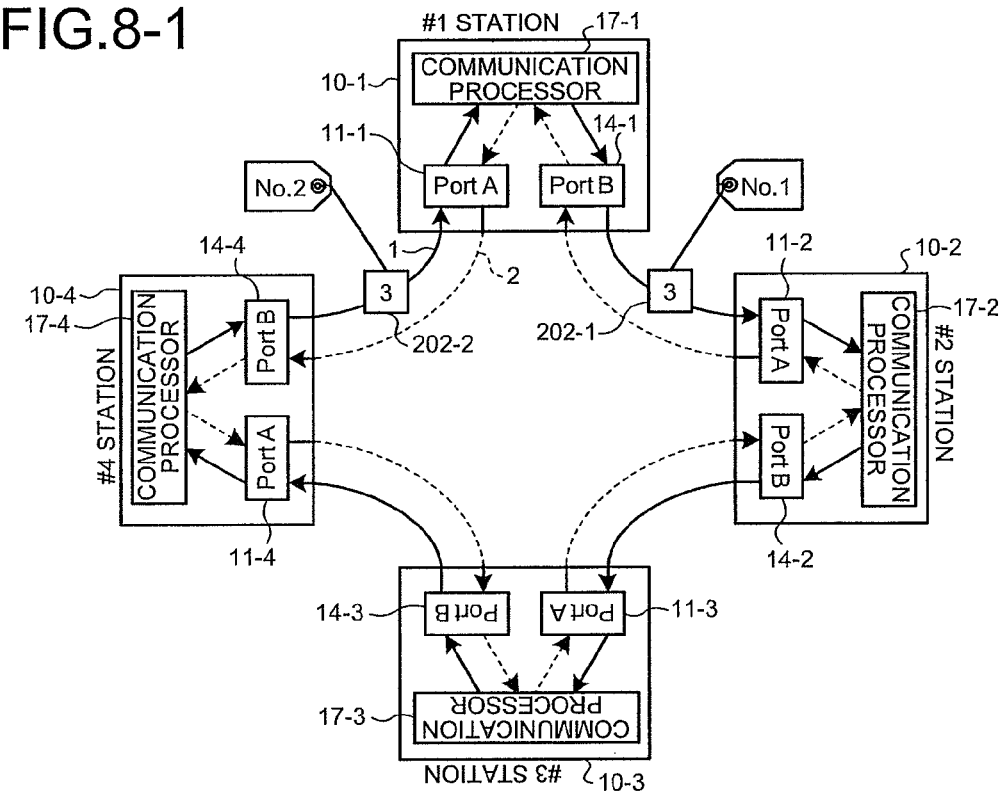
Figures 2, 8:
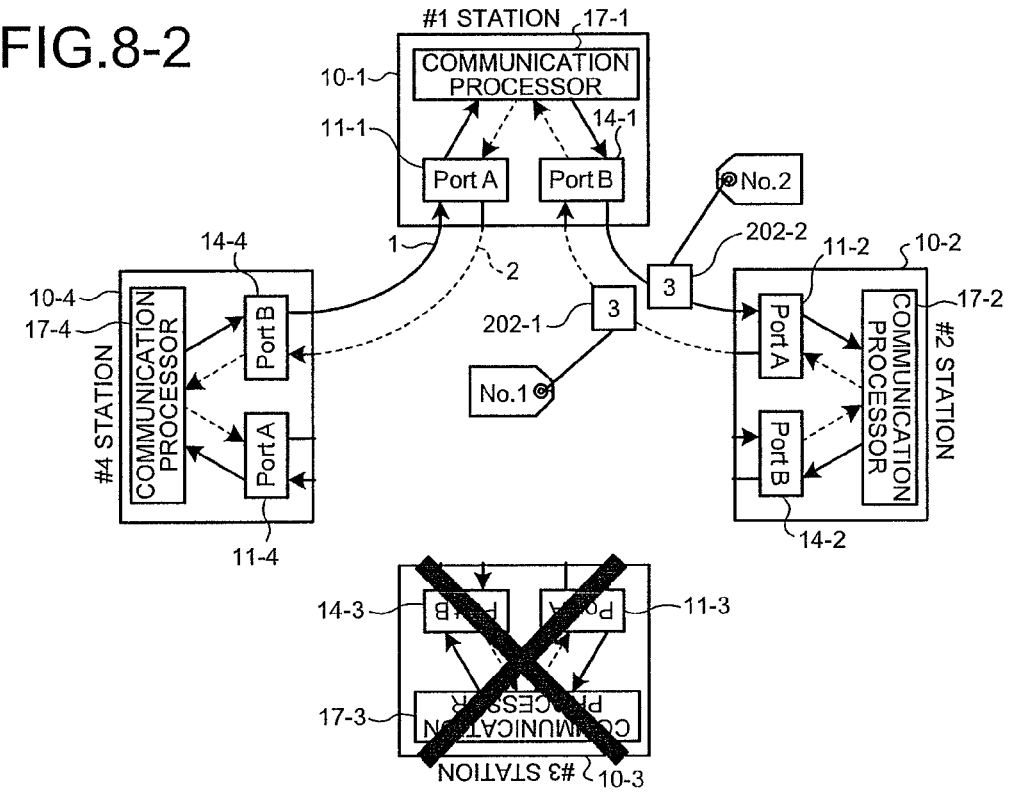
Figures 3, 8:
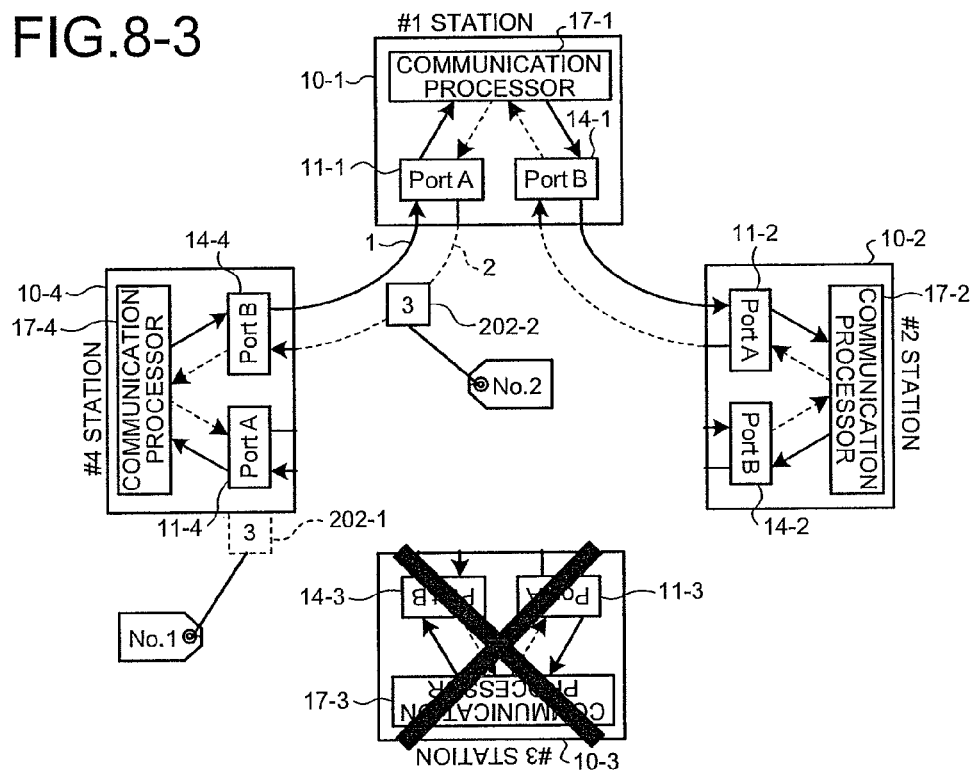
Figures 4, 8:
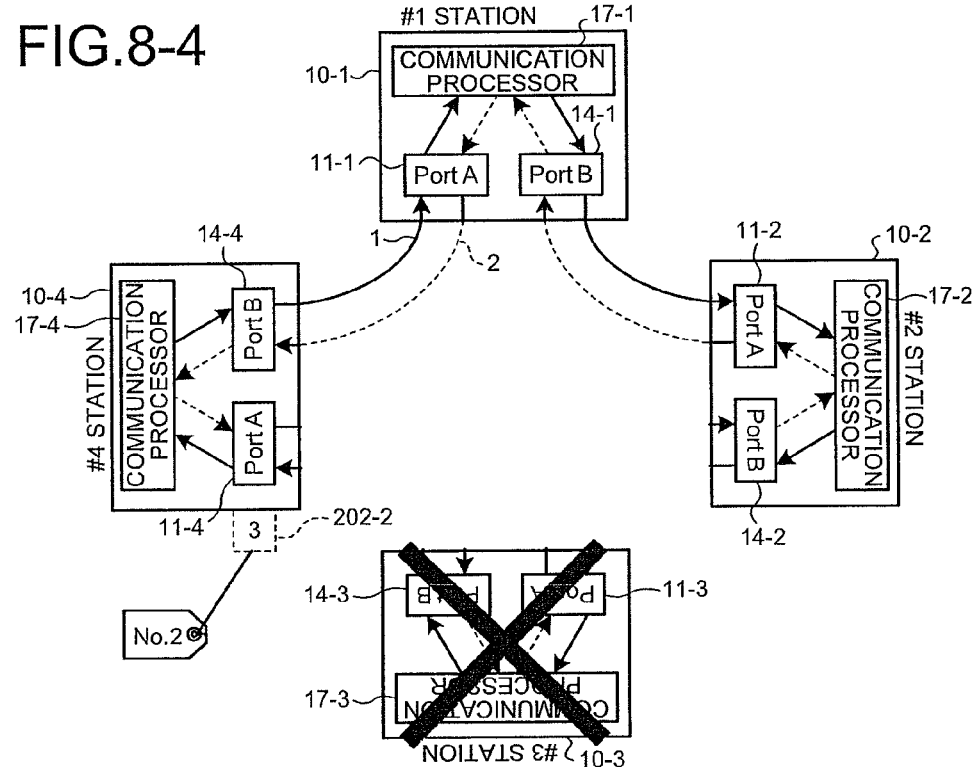

FIG. 8-1 to FIG. 8-4 are diagrams each schematically showing an example of a procedure of a discard process of a ring-establishment check frame issued by a communication node that is disconnected from the network due to occurrence of a failure during the check process of the connection configuration of the ring. The ring-establishment check-frame issuing unit 21 of the communication processor 17-3 in the #3 station 10-3 issues first and second ring-establishment check frames 202-1 and 202-2 with serial numbers "No. 1" and "No. 2" at a time T1 and a time T2, respectively, and the frames circulate around the ring (FIG. 8-1).

FIG. 9-1 is a diagram showing an example of received-frame information held by the #4 station in the situation shown in FIG. 8-1. FIG. 9-2 is a diagram showing an example of received-frame information held by the #1 station in the situation shown in FIG. 8-1. The received-frame information is represented as an example in which a communication node name being a source of a ring-establishment check frame, a serial number as frame identification information embedded in the ring-establishment check frame, and an issuance time of the ring-establishment check frame are stored. It is noted that a globally unique MAC (Media Access Control) address can also be used as the node name. As shown in FIG. 9-1, the #4 station 10-4 sequentially receives the first and the second ring-establishment check frames 202-1 and 202-2, however, the second ring-establishment check frame 202-2 is the latest, and thus the received-frame information for the second ring-establishment check frame 202-2 is stored. Meanwhile, as shown in FIG. 9-2, the #1 station 10-1 receives only the first ring-establishment check frame 202-1, and thus, the received-frame information for the first ring-establishment check frame 202-1 is stored. Although only the #4 station 10-4 and the #1 station 10-1 are explained here, each of the other stations also acquires received-frame information for the ring-establishment check frame sent from the B port 14 and stores the information.

Thereafter, it is assumed that a failure occurs in the #3 station 10-3. Thus, the B port 14-2 of the #2 station 10-2 and the A port 11-4 of the #4 station 10-4 detect that light does not arrive from the #3 station 10-3 when the cable is an optical fiber, or detect that an electrical signal does not arrive from the #3 station 10-3 when the cable is an electric wire, and these ports thereby detect that the failure occurs in the #3 station 10-3. As explained in the first embodiment, the #2 station 10-2 performs loop-back at the A port 11-2 and the #4 station 10-4 performs loop-back at the B port 14-4 (FIG. 8-2). Consequently, the ring-establishment check frame issued by the #3 station 10-3 is left in a new ring established by the loop-back. As shown in FIG. 8-2, the first ring-establishment check frame results in passing around the standby-system ring 2.

Subsequently, the first ring-establishment check frame 202-1 is received by the B port 14-4 of the #4 station 10-4, and the first ring-establishment check frame 202-1 is ready to be transmitted from the B port 14-4 because it is in the loop-back state. Before the transmission, the received-frame-information management unit 31 of the communication processor 17-4 in the #4 station 10-4 receives the first ring-establishment check frame 202-1, and acquires the received-frame information in the above manner, and checks the received-frame information against the corresponding received-frame information of the #3 station 10-3 stored in the received-frame-information storage unit 32. At this time, the serial number of the received first ring-establishment check frame 202-1 is "No. 1", however, as shown in FIG. 9-1, the serial number of the stored received-frame information is "No. 2". Therefore, the received-frame-information management unit 31 recognizes the received first ring-establishment check frame 202-1 as the previously repeated ring-establishment check frame, and discards the frame (FIG. 8-3).

Likewise, the received-frame-information management unit 31 of the communication processor 17-4 in the #4 station 10-4 receives the second ring-establishment check frame 202-2 and the serial number thereof is "No. 2". As shown in FIG. 9-1, because the serial number of the stored received-frame information is "No. 2", the received-frame-information management unit 31 recognizes the received second ring-establishment check frame 202-2 as the previously repeated ring-establishment check frame, and discards the frame (FIG. 8-4). Thus, the process of removing the ring-establishment check frame having been issued by the #3 station 10-3 and being left in the new ring due to disconnection of the #3 station 10-3 is performed.

In FIG. 8-3, the reason why the #1 station 10-1 that receives the first and the second ring-establishment check frames 202-1 and 202-2 passing around the standby-system ring 2 does not perform the discard process thereon is because, as is initially explained, it is assumed that the #1 station 10-1 performs the process of filtering only the frame sent from the B port 14-1 and does not load a data frame passing from the B port 14-1 to the A port 11-1 within the communication node but simply causes the data frame to pass thereto.

This is only one example, and thus, the discard process may be performed on both the data frame sent from the A port 11 and the data frame sent from the B port 14. In this case, the received frame information for the ring-establishment check frames sent from the respective ports is stored. If the communication node has the construction as explained above, the #1 station 10-1 can perform the discard process on the first and the second ring-establishment check frames 202-1 and 202-2 in FIG. 8-3. However, when the process of determining whether the data frames sent from both the A port 11 and the B port 14 are to be discarded is performed, it takes time for this process, and if the cable has a high transmission speed, the processing speed becomes low as compared with the transmission speed of the cable, which may cause the communication speed as a whole to become low.

Furthermore, when the frame identification information is the serial number that is incremented by one as explained in the example, it is possible to determine whether the ring-establishment check frame is the old or the new using the serial number, and thus no time (e.g., issuance time) is required for the received-frame information. However, when the frame identification information is formed with some other symbols or random values, it is necessary to store the received-frame information containing the time (e.g., issuance time). This is because addition of the time information enables to determine whether the received ring-establishment check frame is the old or the new.

According to the third embodiment, a failure occurs in any one of the communication nodes 10 and the communication node 10 is disconnected from the network in the middle of the ring-establishment check process, to configure the new ring, and thereafter, the ring-establishment check frame having been issued by the disconnected communication node 10 and being left in the ring is discarded. Thus, the third embodiment has an effect that it is possible to prevent an unnecessary frame of the disconnected communication node 10 from remaining on the ring.

Fourth Embodiment

The second embodiment is configured to check the connection configuration of the ring when the ring-establishment check frame is not detected for the frame circulation time or more since the last detection of the ring-establishment check frame. If a failure occurs in any one of the communication nodes and the communication node is thereby disconnected from the network in the middle of the ring-establishment check process according to the second embodiment, the loop-back is performed so as to eliminate the communication node. The third embodiment explains the method of eliminating the ring-establishment check frame issued by the eliminated communication node from the new ring formed due to the loop-back. However, the second and the third embodiments do not mention the ring-establishment check process after the loop-back is performed. Therefore, a fourth embodiment of the present invention will explain a method of performing the ring-establishment check process after the loop-back is performed.

A communication node of the fourth embodiment has the same configuration as that of the third embodiment in FIG. 7. However, the ring-establishment check-frame issuing unit 21 further includes a function of transmitting a ring-establishment check frame by embedding therein channel state information, in addition to an issuance time and an identification number for identifying a frame, which indicates whether the own communication node 10 is in a state of enabling normal frame transmission and reception by the A port 11 and the B port 14 (hereinafter, called "through state") or in a loop-back state when the ring-establishment check frame is issued. It is noted that in the case of the loop-back state, the channel state information also includes information indicating at which of the A port 11 and the B port 14 the loop-back is performed. The ring-establishment check-frame issuing unit 21 also includes a function of receiving the ring-establishment check frame issued by the own communication node 10, stopping issuing the ring-establishment check frame when the channel state information in the frame is the same as the current channel state, and continuing to issue the ring-establishment check frame when the channel state information in the frame is different from the current channel state, and, in this case, causing the frame-circulation-time calculating unit not to perform the calculation process of a frame circulation time.

Figures 1, 10:
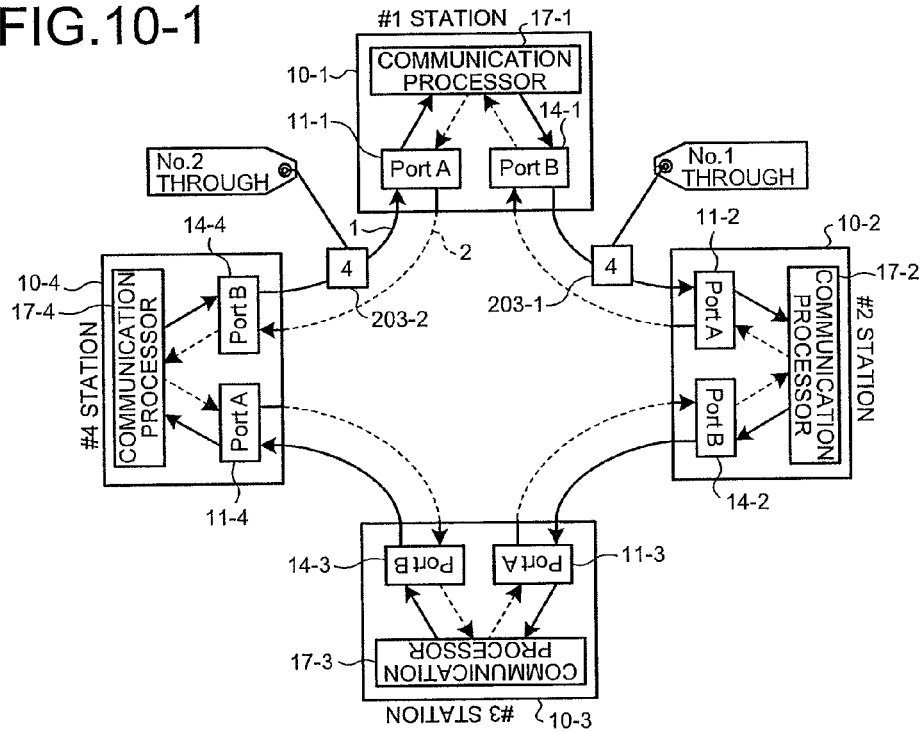
Figures 2, 10:
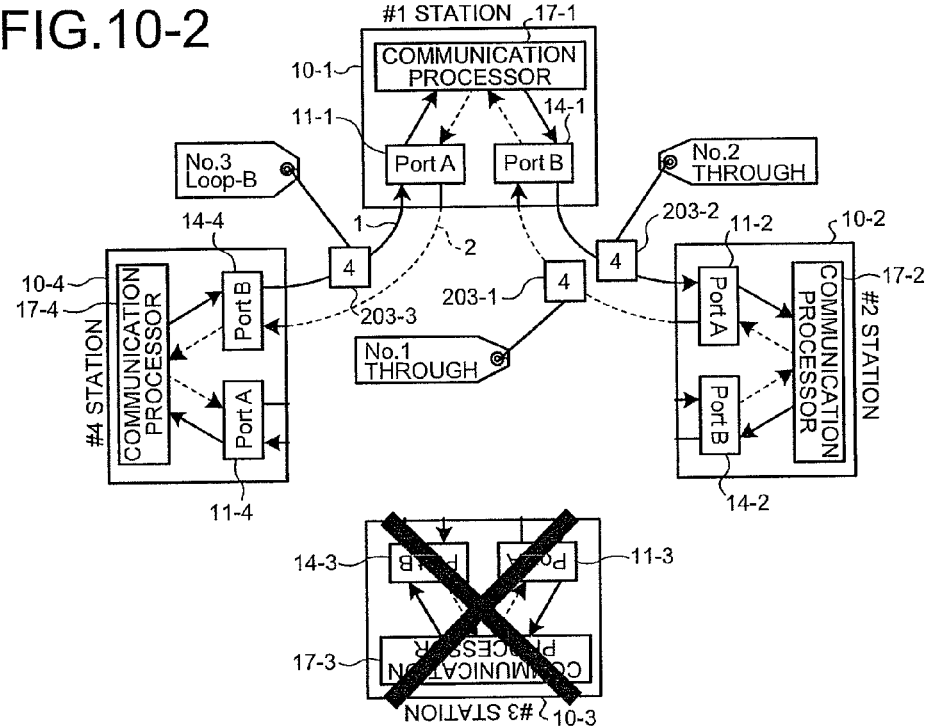
Figures 3, 10:
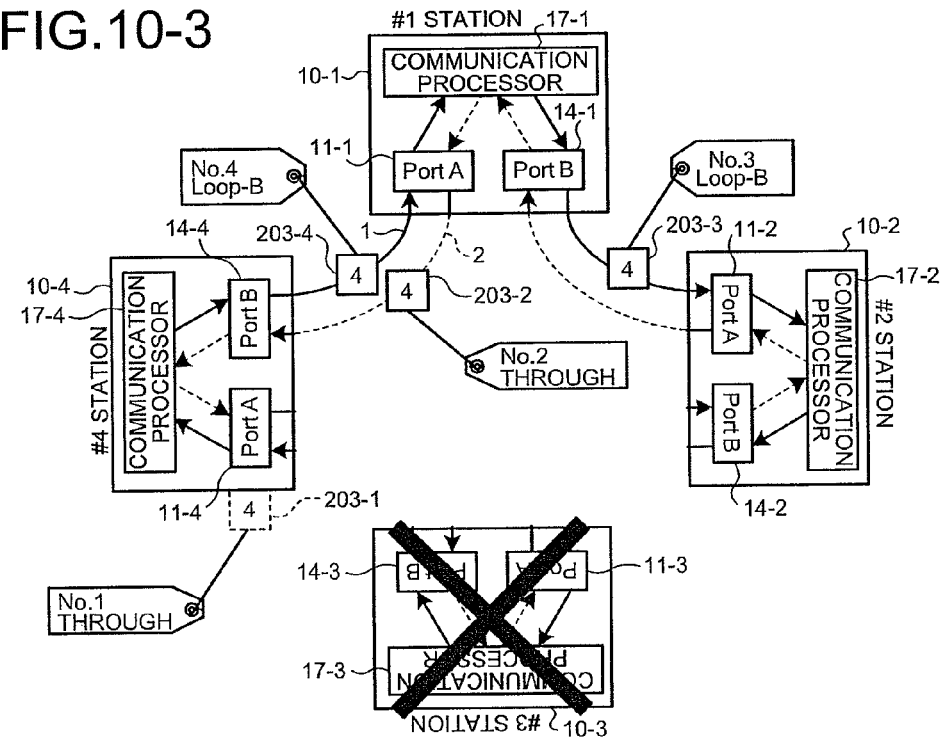
Figures 4, 10:
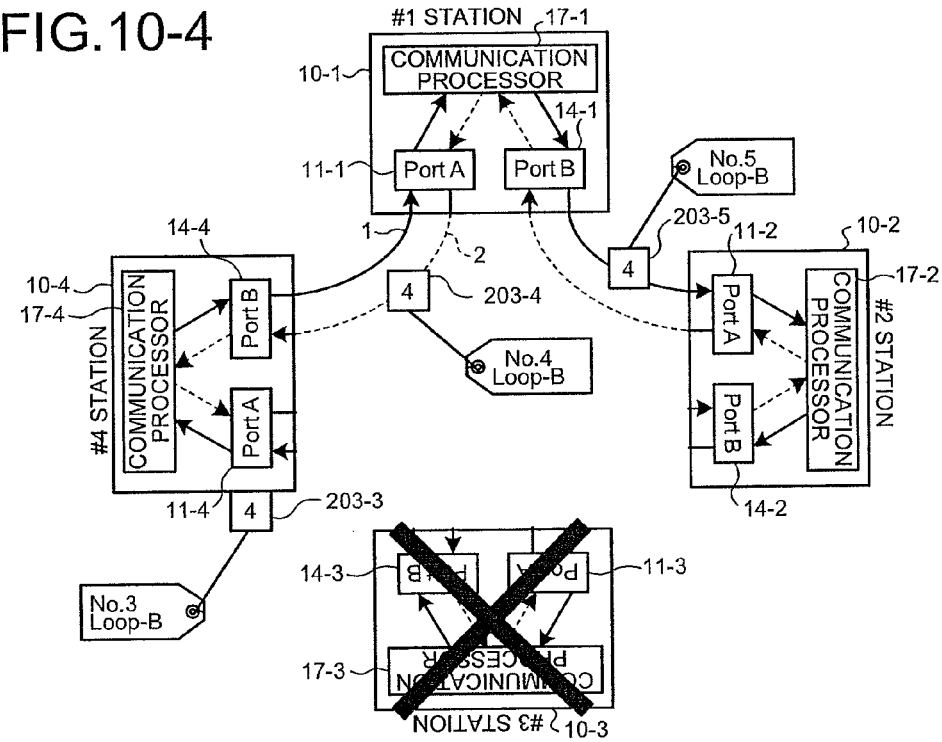
Figures 5, 10:
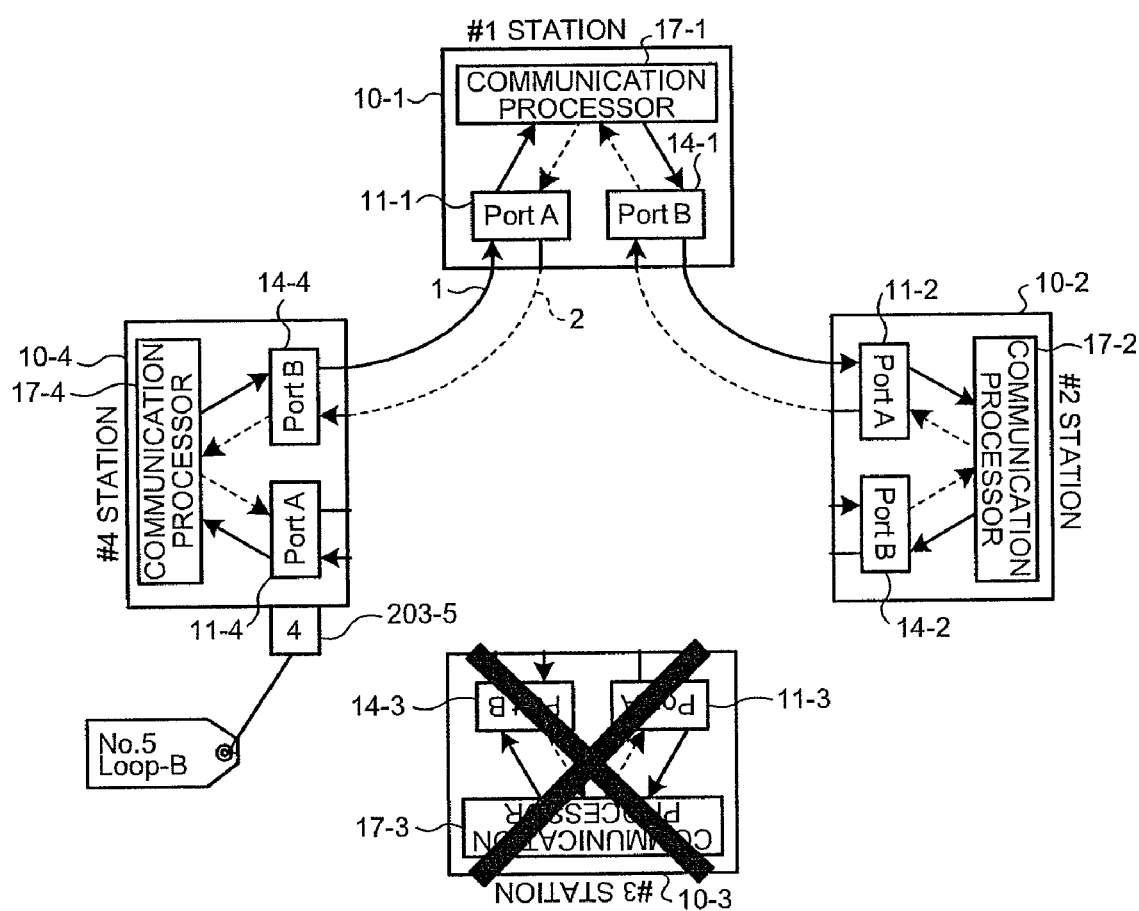

FIG. 10-1 to FIG. 10-5 are diagrams each schematically showing an example of a procedure of a check process for a connection configuration of a new ring formed after loop-back occurs. FIG. 10-1 to FIG. 10-5 show states each focused on a case in which the #4 station 10-4 checks establishment of the ring. First, all the #1 station 10-1 to the #4 station 10-4 are in the normal state without occurrence of a failure and all the communication nodes 10-1 to 10-4 are in the through state. It is assumed that the ring-establishment check-frame issuing unit 21 of the communication processor 17-4 in the #4 station 10-4 has issued first and second ring-establishment check frames 203-1 and 203-2, at time T1 and T2, in-which information with the serial numbers of "No. 1" and "No. 2" and with the channel state information of "through" and "through" is embedded, respectively (FIG. 10-1).

Thereafter, a failure is assumed to occur in the #3 station 10-3. Consequently, the B port 14-2 of the #2 station 10-2 and the A port 11-4 of the #4 station 10-4 detect the occurrence of the failure in the #3 station 10-3, and, as explained in the first embodiment, the #2 station 10-2 performs the loop-back at the A port 11-2 and the #4 station 10-4 performs the loop-back at the B port 14-4. Thus, the channel state of the #2 station 10-2 becomes "Loop-A"(not shown) indicating that the loop-back is performed at the A port 11-2, and the channel state of the #4 station 10-4 becomes "Loop-B" indicating that the loop-back is performed at the B port 14-4. At time T3 when a predetermined time passes after the second ring-establishment check frame 203-2 is issued, the ring-establishment check-frame issuing unit 21 of the #4 station 10-4 issues a third ring-establishment check frame 203-3 in which information with the serial number of "No. 3" and with the channel state information of "Loop-B" is embedded (FIG. 10-2). It is noted that when the ring-establishment check frame issued by the #3 station 10-3 is left within a newly formed ring due to the loop-back, the frame is discarded by the procedure of the third embodiment.

Thereafter, the ring-establishment check-frame issuing unit 21 of the communication processor 17-4 in the #4 station 10-4 receives the first ring-establishment check frame 203-1 in which the channel state information issued by the own station is "through". However, the current channel state of the own station is "Loop-B" being the loop-back state of the B port 14, and both the channel states do not coincide with each other, and thus the ring-establishment check-frame issuing unit 21 continuously issues the ring-establishment check frames at a predetermined time interval (FIG. 10-3). The received first ring-establishment check frame 203-1 is discarded. The second ring-establishment check frame 203-2 received subsequently is also discarded.

After the time further passes, the ring-establishment check-frame issuing unit 21 of the communication processor 17-4 in the #4 station 10-4 receives the third ring-establishment check frame 203-3 in which the channel state information issued by the own station is "Loop-B", and then stops issuing the ring-establishment check frame because its channel state coincides with "Loop-B" being the current channel state of the own station (FIG. 10-4). The frame-circulation-time calculating unit 22 calculates a frame circulation time by the procedure explained in the second embodiment using the third ring-establishment check frame 203-3. Thereafter, the received third ring-establishment check frame 203-3 is discarded.

Thereafter, the #4 station 10-4 sequentially receives a fourth ring-establishment check frame 203-4 in which the serial number issued by the own station is "No. 4" and the channel state information is "Loop-B" and a fifth ring-establishment check frame 203-5 in which the serial number is "No. 5" and the channel state information is "Loop-B", and then discards the respective frames (FIG. 10-5). The same processes as above are also performed in the other stations. Thereafter, as explained in the second embodiment with reference to FIG. 6-5 to FIG. 6-6, by checking that the frame circulation time or more passes since the last observation of the ring-establishment check frame, the process of checking a connection configuration of the ring after being looped-back is finished.

According to the fourth embodiment, even when the failure occurs and the communication node 10 is disconnected during the process of checking the connection configuration of the ring and the ring configuration is thereby changed, at least one of the communication nodes 10 added to the network can receive the ring-establishment check frame 203 issued by the own communication node 10 through a finally formed transmission channel of the network, corresponding to the connection configuration of the new ring. Therefore, the fourth embodiment has an effect that it is possible to configure the ring even if a plurality of communication nodes 10 is further added or removed to or from the ring during ring configuration.

Fifth Embodiment

Figures 1, 11:
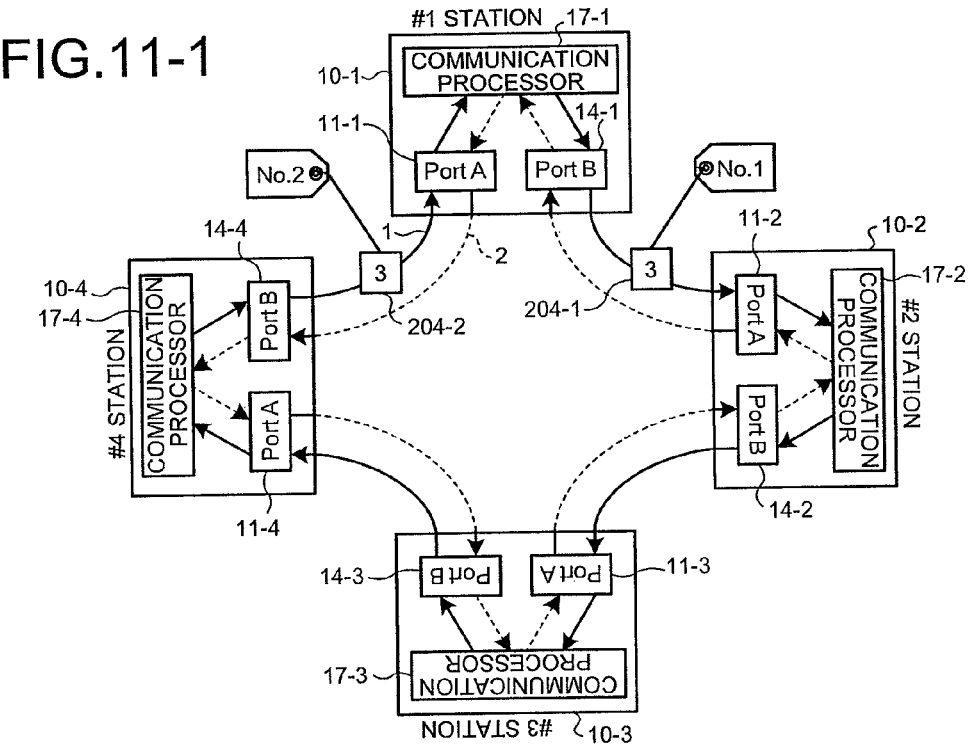
Figures 2, 11:
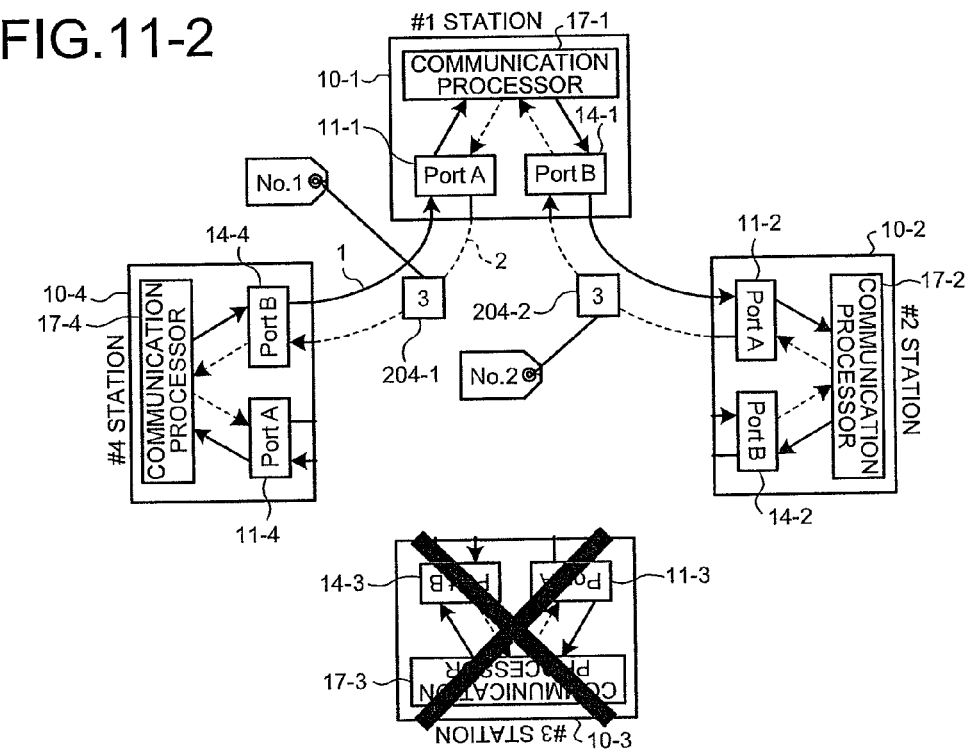
Figures 3, 11:
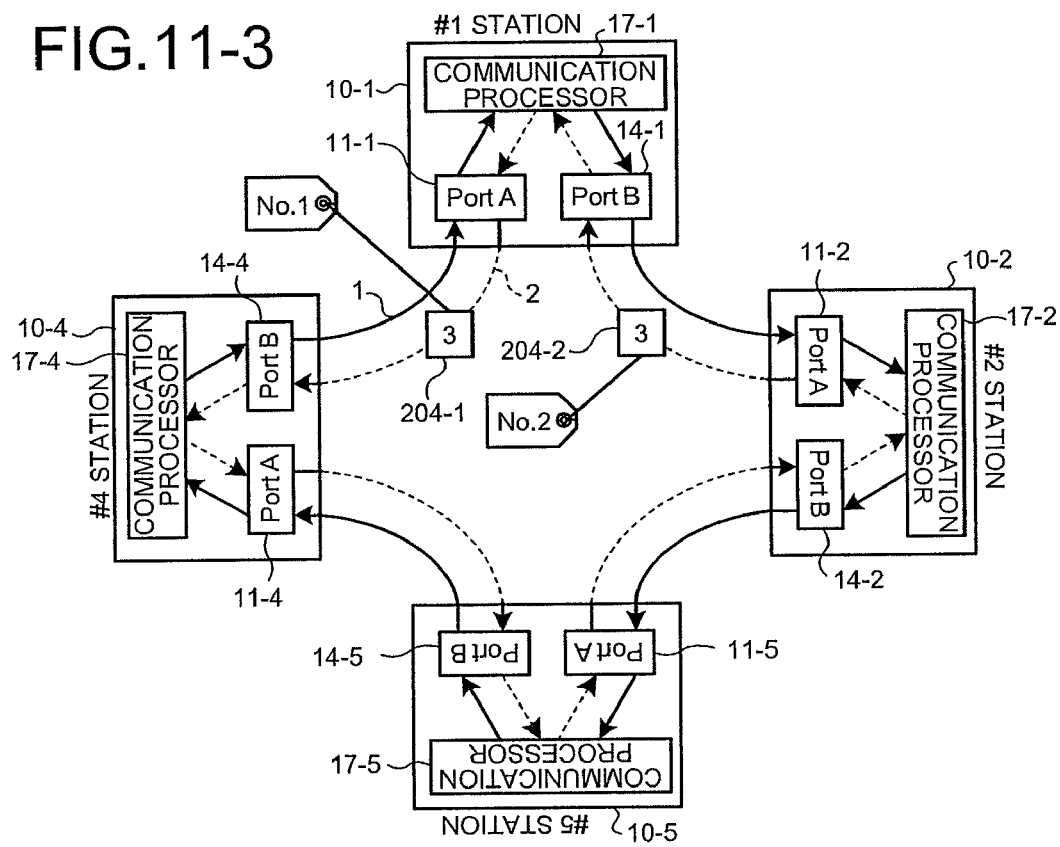

FIG. 11-1 to FIG. 11-3 are diagrams each showing a status causing a problem that may possibly occur during the ring-establishment check process. First, it is assumed that the #1 station 10-1 to #4 station 10-4 are normally connected to each other. Then, it is assumed that the ring-establishment check-frame issuing unit 21 of the communication processor 17-3 in the #3 station 10-3 has issued first and second ring-establishment check frames 204-1 and 204-2, at time T1 and T2, in which the serial numbers of "No. 1" and "No. 2" are embedded, respectively (FIG. 11-1).

Thereafter, a failure is assumed to occur in the #3 station 10-3. Consequently, the B port 14-2 of the #2 station 10-2 and the A port 11-4 of the #4 station 10-4 detect the occurrence of the failure in the #3 station 10-3, and, as explained in the first embodiment, the #2 station 10-2 performs the loop-back at the A port 11-4 and the #4 station 10-4 performs the loop-back at the B port 14-4. Consequently, the first and second ring-establishment check frames 204-1 and 204-2 issued by the #3 station 10-3 are left within a new ring configured due to the loop-back (FIG. 11-2).

Further thereafter, it is assumed that before the first and second ring-establishment check frames 204-1 and 204-2 issued by the #3 station 10-3 are discarded, a #5 station 10-5, in place of the disconnected #3 station 10-3, is added to the network. In this case, a new ring is reconfigured, and the #2 station 10-2 shifts to a through mode from the state of performing the loop-back at the A port 11-2, and the #4 station 10-4 shifts to a through mode from the state of performing the loop-back at the B port 14-4 (FIG. 11-3). As a result, the first and second ring-establishment check frames 204-1 and 204-2 issued by the #3 station 10-3 circulate within the standby-system ring 2. These first and second ring-establishment check frames 204-1 and 204-2 pass through the standby-system ring 2 which is not usually used, and further pass from the B port 14 to the A port 11 within each communication node 10 without being filtered, so that these frames continuously pass permanently without being discarded.

Figure 12:
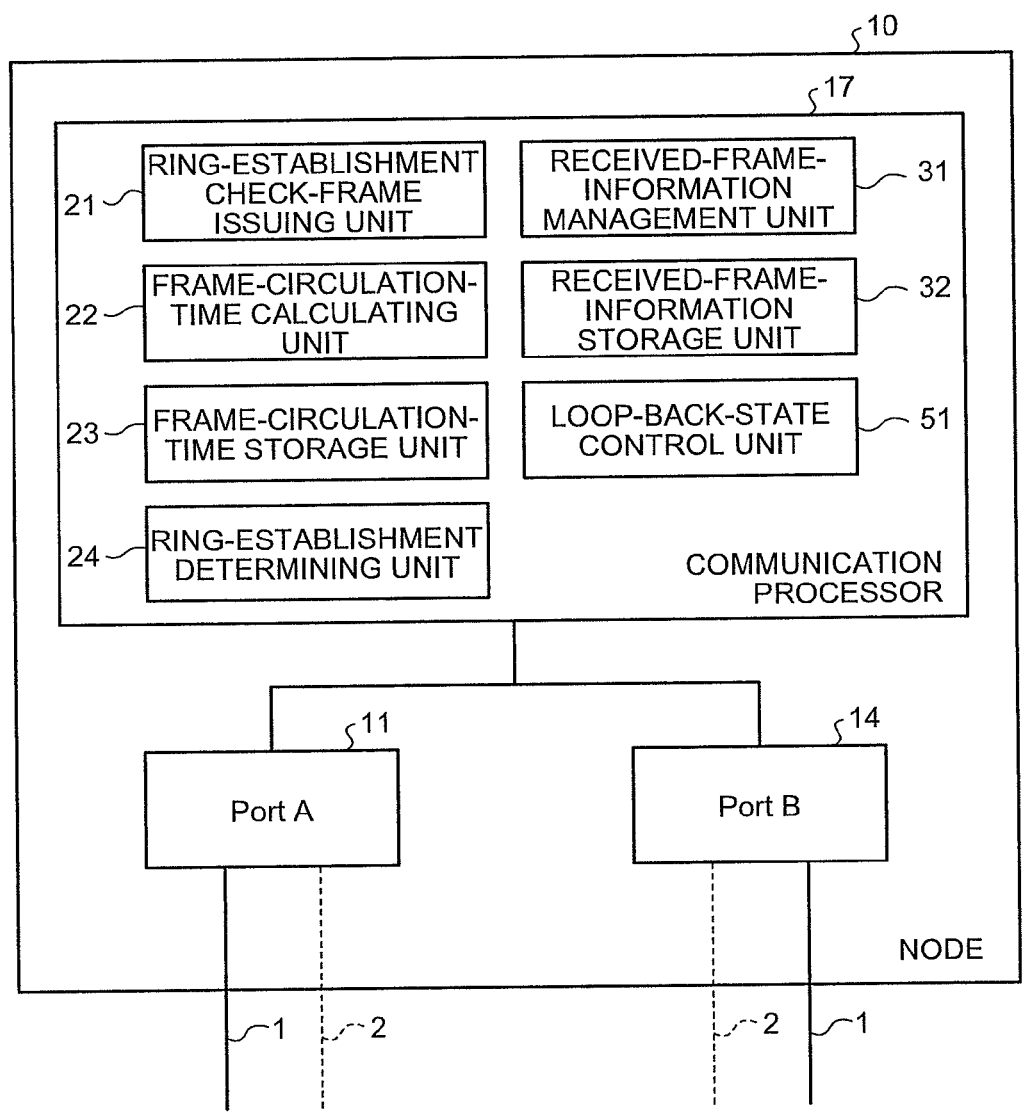
FIG. 12 is a block diagram schematically showing a functional configuration of a communication node according to a fifth embodiment of the present invention.

Therefore, a fifth embodiment of the present invention will explain a method of ring-establishment check process to solve these problems. FIG. 12 is a block diagram schematically showing a functional configuration of a communication node according to the fifth embodiment. The communication processor 17 of a communication node according to the fifth embodiment has a configuration in which a loop-back-state control unit 51 is further provided in FIG. 7 of the third embodiment. It is noted that the same numerals are assigned to the same components as these in the explanation, and thus explanation thereof is omitted.

The loop-back-state control unit 51 stores therein channel-state transition information indicating transition of the channel state of the own communication node, and has a function of controlling a port so as not to release a loop-back state until when all of ring-establishment check frames are not detected for the frame circulation time or more (namely, until a ring-establishment check process is finished) which is performed at a final process following the processes of configuring a new ring due to disconnection of a neighboring communication node, and discarding a ring-establishment check frame issued by the disconnected communication node when other communication node in place of the disconnected communication node is added to the new ring before the ring-establishment check process for the new ring is finished.

Figures 1, 13:
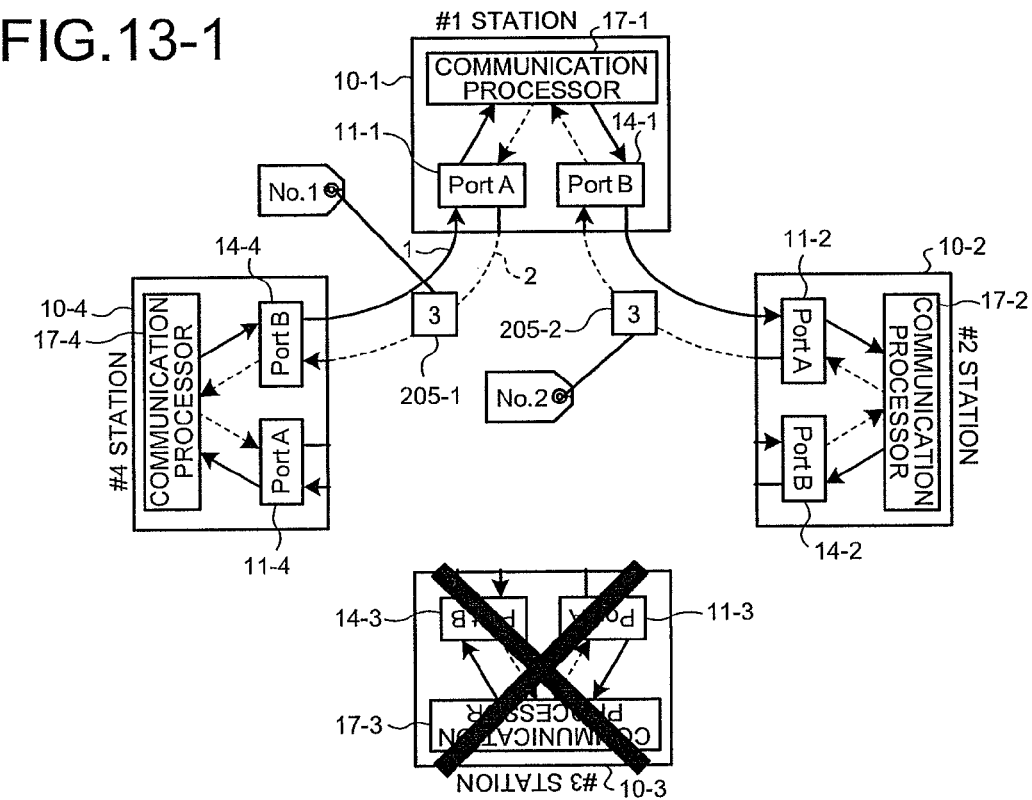
Figures 2, 13:
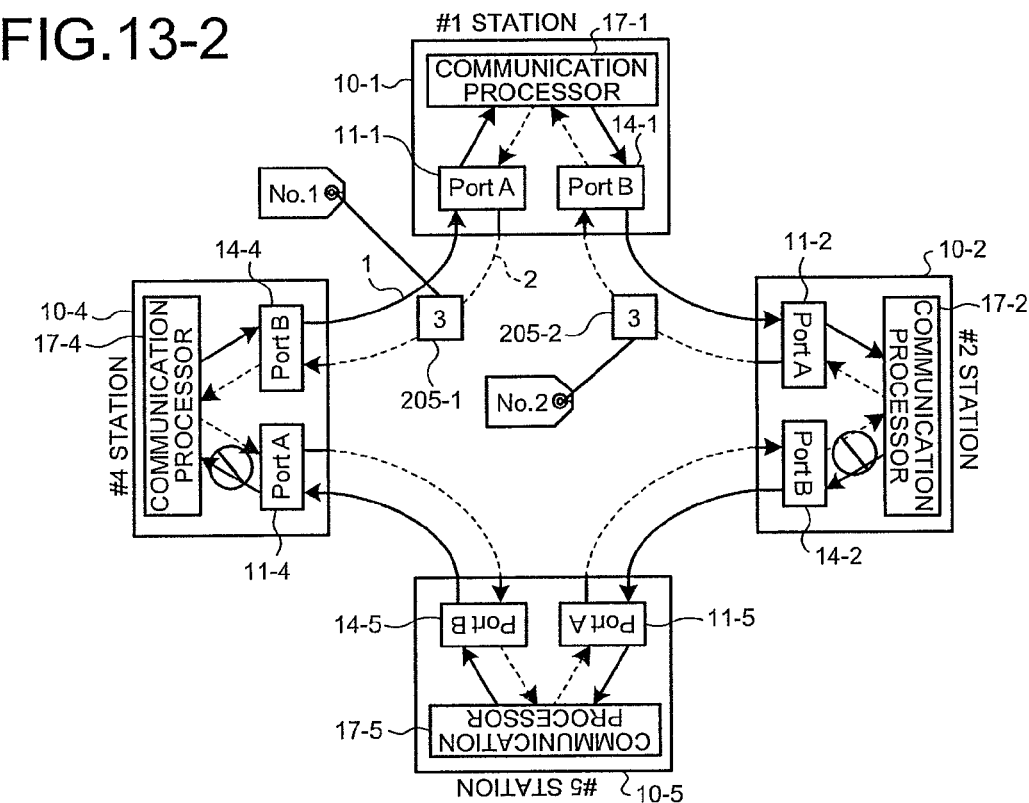

Next, operations are explained below with reference to FIG. 11-1, FIG. 13-1, and FIG. 13-2. FIG. 13-1 and FIG. 13-2 are diagrams each schematically showing an example of a procedure of a ring-establishment check process when a new communication node, in place of a disconnected communication node, is added to a ring. First, as shown in FIG. 11-1, the #1 station 10-1 to #4 station 10-4 are normally connected to each other, and the ring-establishment check-frame issuing unit 21 of the communication processor 17-3 in the #3 station 10-3 issues first and second ring-establishment check frames, at time T1 and T2, in which the serial numbers of "No. 1" and "No. 2" are embedded, respectively.

Thereafter, a failure is assumed to occur in the #3 station 10-3. Consequently, the B port 14-2 of the #2 station 10-2 and the A port 11-4 of the #4 station 10-4 detect the occurrence of the failure in the #3 station 10-3, and, as explained in the first embodiment, the #2 station 10-2 performs the loop-back at the A port 11-2 and the #4 station 10-4 performs the loop-back at the B port 14-4. At this time, each loop-back-state control unit 51 of the communication processors 17-2 and 17-4 in the #2 station 10-2 and the #4 station 10-4 stores therein the channel-state transition information indicating transition of the channel state from the through state to the loop-back state (FIG. 13-1).

Further, it is assumed that before first and second ring-establishment check frames 205-1 and 205-2 issued by the #3 station 10-3 are discarded, the #5 station 10-5, in place of the disconnected #3 station 10-3, is added to the network. At this time, the #3 station 10-3 detects that the #5 station 10-5 is added to the network, but does not configure the ring with the #5 station 10-5 because the #3 station 10-3 is in the transition state from the through state to the loop-back state according to the channel-state transition information (FIG. 13-2). Specifically, to prevent circulation of the ring-establishment check frame issued by the #3 station 10-3 around the standby-system ring 2 as explained with reference to FIG. 11-3, the loop-back-state control unit 51 of the communication processor 17-2 in the #2 station 10-2 controls so as to cause the B port 14-2 to enter an unusable state while the loop-back state is maintained at the A port 11-2, and the loop-back-state control unit 51 of the communication processor 17-4 in the #4 station 10-4 controls so as to cause the A port 11-4 to enter an unusable state while the loop-back state is maintained at the B port 14-4. This state is maintained until the check process of new ring establishment due to the loop-back in FIG. 13-2 is finished.

Thereafter, as explained in the second embodiment, after all the ring-establishment check frames 205-1 and 205-2 on the ring are discarded, each loop-back-state control unit 51 of the communication processors 17 in the #2 station 10-2 and the #4 station 10-4 controls the channel state from the loop-back state to the through state, and rewrites the channel-state transition information to the through state. Consequently, each ring-establishment check-frame issuing unit 21 in the #2 station 10-2 and the #4 station 10-4 executes a new ring-establishment check process in the network including the #5 station 10-5 newly added thereto. It is noted that the #2 station 10-2 and the #4 station 10-4 are communication nodes that can learn the finish of the ring-establishment check process for the ring when the #3 station 10-3 is disconnected therefrom, and learn that the #5 station 10-5 is a communication node newly added to the ring, and thus, the check process of the new ring establishment is performed starting from the #2 station 10-2 and the #4 station 10-4.

According to the fifth embodiment, there is an effect that when the neighboring communication node is disconnected and other communication node in place of the disconnected communication node is added before the ring-establishment check frame issued by the communication node 10 and left in the standby system is discarded, it is possible to prevent the ring-establishment check frame issued by the disconnected communication node from continuously circulating around the ring formed with other new communication node added thereto without being discarded.

Sixth Embodiment

A sixth embodiment of the present invention will explain a configuration of a communication node that prevents the ring-establishment check frame from remaining in the standby-system ring similarly to the fifth embodiment, and a method of handling the problem. The configuration of the communication node used in the sixth embodiment is the same as that of the third embodiment as shown in FIG. 7. However, the received-frame-information management unit 31 of the communication node according to the sixth embodiment further has a function of acquiring received-frame information containing frame identification information only for the ring-establishment check frame issued by the own communication node, of frames that circulate around the standby-system ring 2 and pass from the B port 14 to the A port 11, checking the acquired received-frame information against the received-frame information stored in the received-frame-information storage unit 32, storing the received-frame information for the ring-establishment check frame in the received-frame-information storage unit 32 when it is not the same as the previously received one, and discarding the ring-establishment check frame when it is the same as the previously received one. Further, the received-frame-information storage unit 32 stores the received-frame information for the ring-establishment check frame issued by the own communication node, of the frames acquired by the received-frame-information management unit 31 and circulating around the standby-system ring 2. It is noted that the same numerals are assigned to the same components as these in the explanation, and thus explanation thereof is omitted.

Figures 1, 14:
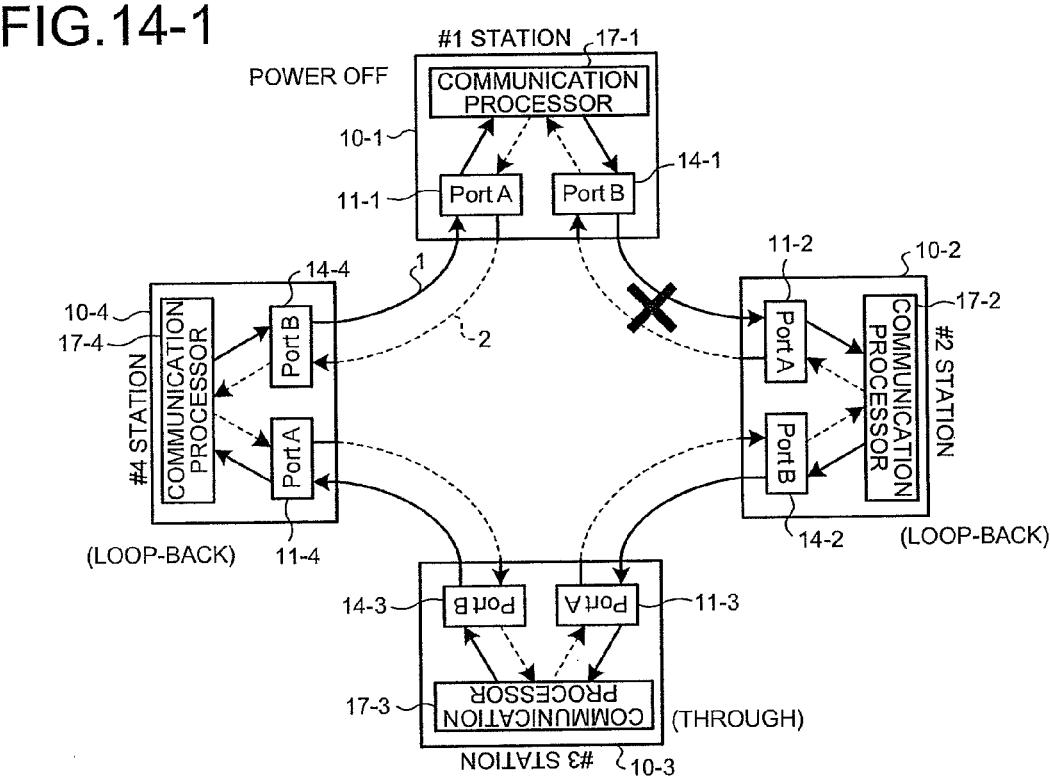
Figures 2, 14:
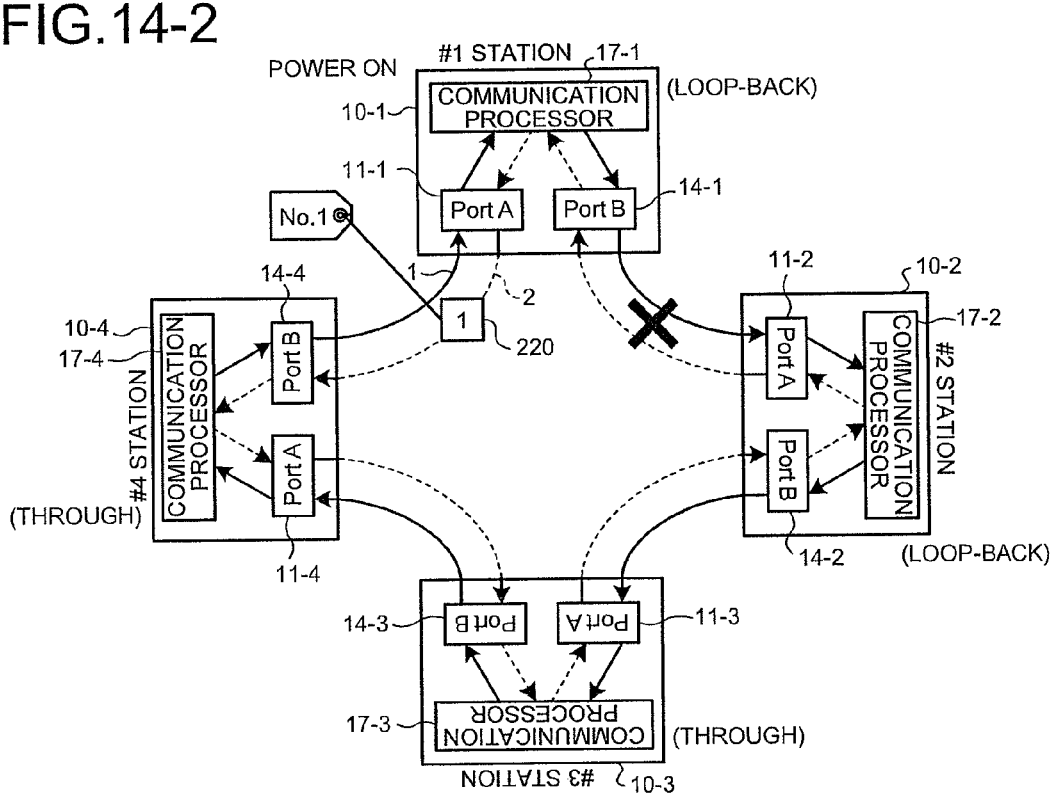
Figures 3, 14:
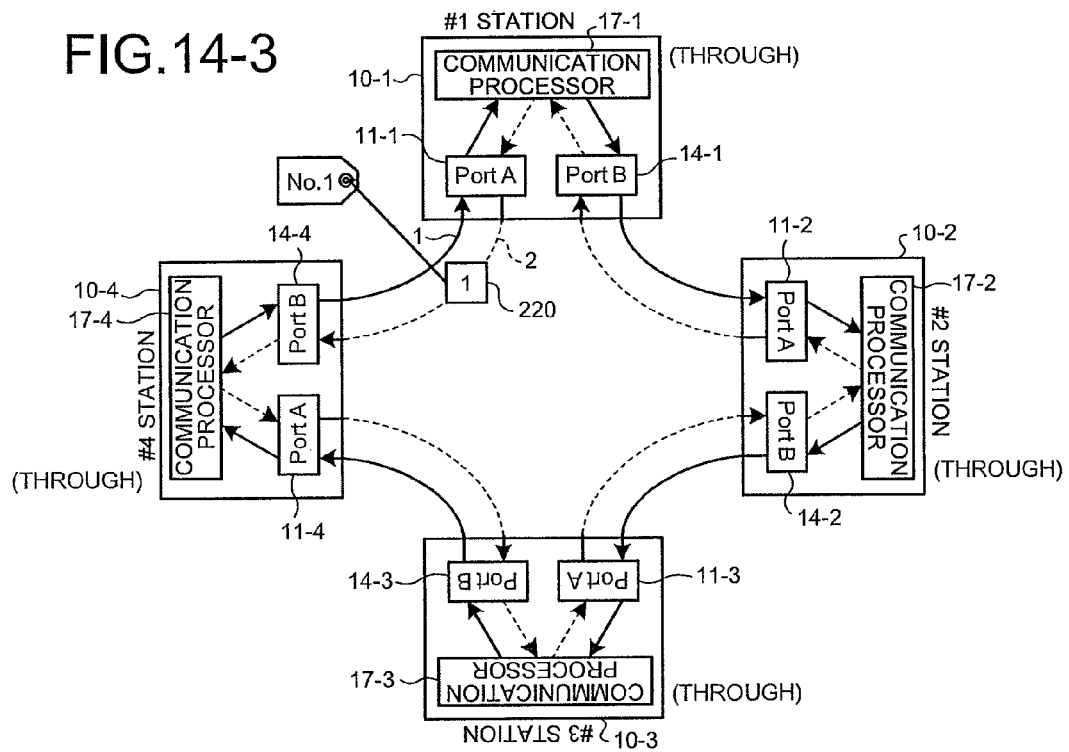
Figures 4, 14:
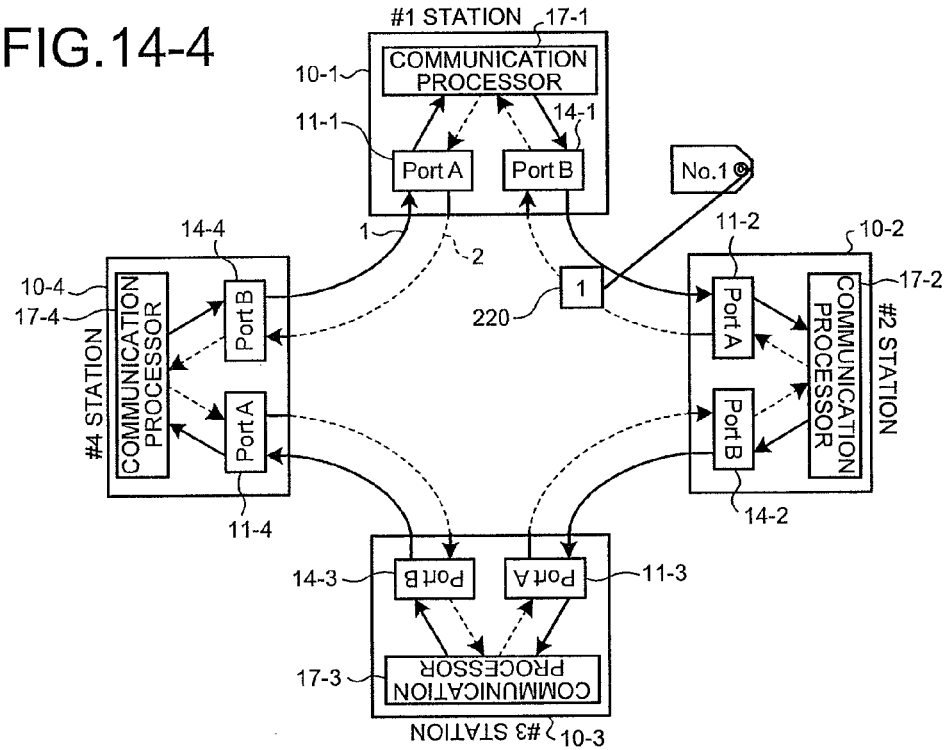
Figures 5, 14:
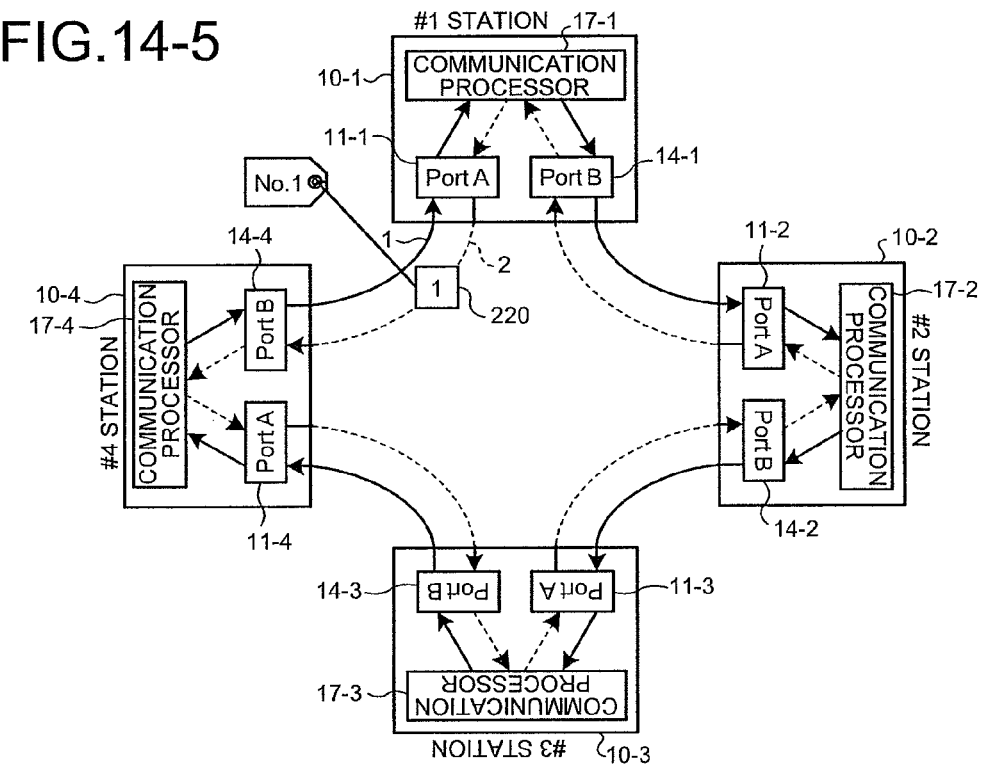
Figures 6, 14:
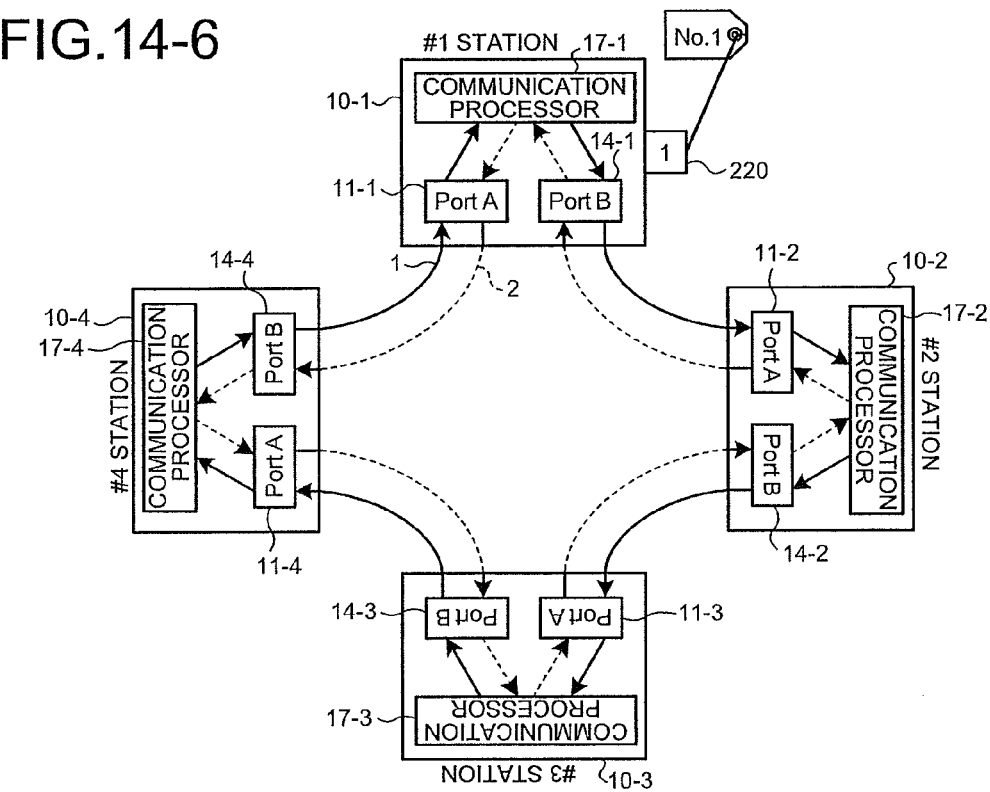

Next, operations are explained below with reference to FIG. 14-1 to FIG. 14-6. FIG. 14-1 to FIG. 14-6 are diagrams each schematically showing an example of a procedure of a discard process for a ring-establishment check frame passing around the standby-system ring. Assuming that the #1 station 10-1 to the #4 station 10-4 are normally connected to each other but the normal-system ring 1 between the #1 station 10-1 and the #2 station 10-2 is disconnected and further the power fails and the #1 station 10-1 is thereby turned OFF, the A port 11-2 of the #2 station 10-2 detects the disconnection of the normal-system ring 1, and the loop-back is performed at the B port 14-2 as explained in the first embodiment. The B port 14-4 of the #4 station 10-4 detects that communication with the #1 station 10-1 cannot be performed, and the loop-back is performed at the A port 11-4 as explained in the first embodiment (FIG. 14-1).

Thereafter, when the power to the #1 station 10-1 is turned on to become an ON-state, the B port 14-4 of the #4 station 10-4 detects recovery of the #1 station 10-1, and transits from the loop-back state to the normal through state. The B port 14-1 of the #1 station 10-1 being turned on detects the disconnection of the normal-system ring 1 between the #1 station 10-1 and the #2 station 10-2, and the loop-back is performed at the A port 11-1 as explained in the first embodiment. The ring-establishment check-frame issuing unit 21 of the communication processor 17-1 in the #1 station 10-1 issues a ring-establishment check frame 220 with the serial number of "No. 1" to the standby-system ring 2 from the A port 11-1 (FIG. 14-2).

Further thereafter, the disconnection of the normal-system ring 1 between the #1 station 10-1 and the #2 station 10-2 is recovered, and the B port 14-1 of the #1 station and the A port 11-2 of the #2 station detect the recovery of the normal-system ring 1 therebetween to transit from the loop-back state to the normal through state, respectively (FIG. 14-3). Consequently, the #1 station 10-1 to the #4 station 10-4 are connected to each other by the normal-system ring 1, so that they can perform communications not in the loop-back state. This causes the ring-establishment check frame 220 issued by the #1 station to be left in the standby-system ring 2.

Thereafter, it is assumed that after the time passes, the ring-establishment check frame 220 passes inside the standby-system ring 2 to reach between the #2 station 10-2 and the #1 station 10-1 (FIG. 14-4). At this time, the received-frame-information management units 31 of the communication processors 17-2 to 17-4 in the #2 station 10-2 to the #4 station 10-4, which receive the frame passing around the standby-system ring 2, receive the ring-establishment check frame 220 from the B ports 14-2 to 14-4, respectively. However, the ring-establishment check frame 220 is not issued by the own communication node, and thus the ring-establishment check frame 220 is passed as it is from the A ports 11-2 to 11-4 to the standby-system ring 2 to be forwarded.

When the #1 station 10-1 receives the ring-establishment check frame 220 issued by the own station from the B port 14-1, the received-frame-information management unit 31 of the communication processor 17-1 determines whether the received ring-establishment check frame 220 is the previously received one by referring to the received-frame information stored in the received-frame-information storage unit 32. In this case, the frame is not the previously received one, and thus the received-frame-information management unit 31 acquires the serial number "No. 1" of the ring-establishment check frame 220, and stores it as the received-frame information in the received-frame-information storage unit 32, and then sends it out from the A port 11-1 (FIG. 14-5).

Further thereafter, the ring-establishment check frame 220 circulates around the standby-system ring 2, however, the #2 station 10-2 to the #4 station 10-4 forward the frame as it is because this frame is not the ring-establishment check frame 220 issued by the own station. When receiving the ring-establishment check frame 220 by the B port 14-1 in the #1 station 10-1, the received-frame-information management unit 31 of the communication processor 17-1 determines the frame as the previously received one by referring to frames in the received-frame-information storage unit 32 to find out that there is the received-frame information corresponding to the serial number "No. 1" among them, and discard the ring-establishment check frame 220 (FIG. 14-6). The explanation is made being focused on the process of discarding the ring-establishment check frame 220 that passes around the standby-system ring 2 after the ring is recovered to the normal state, however, in the normal-system ring 1 recovered to the normal state as shown in FIG. 14-3, the ring-establishment check process as explained in the embodiments is performed in parallel to the above process.

According to the sixth embodiment, the received-frame-information management unit 31 of the communication processor 17 is caused to have the function of acquiring the received-frame information for the ring-establishment check frame 220, issued by the own communication node, passing around the standby-system ring 2, and discarding the ring-establishment check frame 220 received for the second time based on the received-frame information. Thus, the sixth embodiment has an effect that the ring-establishment check frame 220 being left in the standby-system ring 2 due to some reason can be discarded without remaining in the standby-system ring 2. The sixth embodiment has another effect that the load on the process for the frame passing around the standby-system ring 2 can be minimized because only the ring-establishment check frame 220 issued by the own communication node is received and the ring-establishment check frame 220 issued by other node is only forwarded after a record of the forwarding is kept.

Seventh Embodiment

A seventh embodiment of the present invention will explain a ring-establishment check process performed when a failure occurs in a communication node that forms a network and the communication node is thereby disconnected from the network, after a ring-establishment check process is finished in a normal state in which a token frame is made to pass into the normal-system ring 1 to enable transmission of a communication message.

Figure 15:
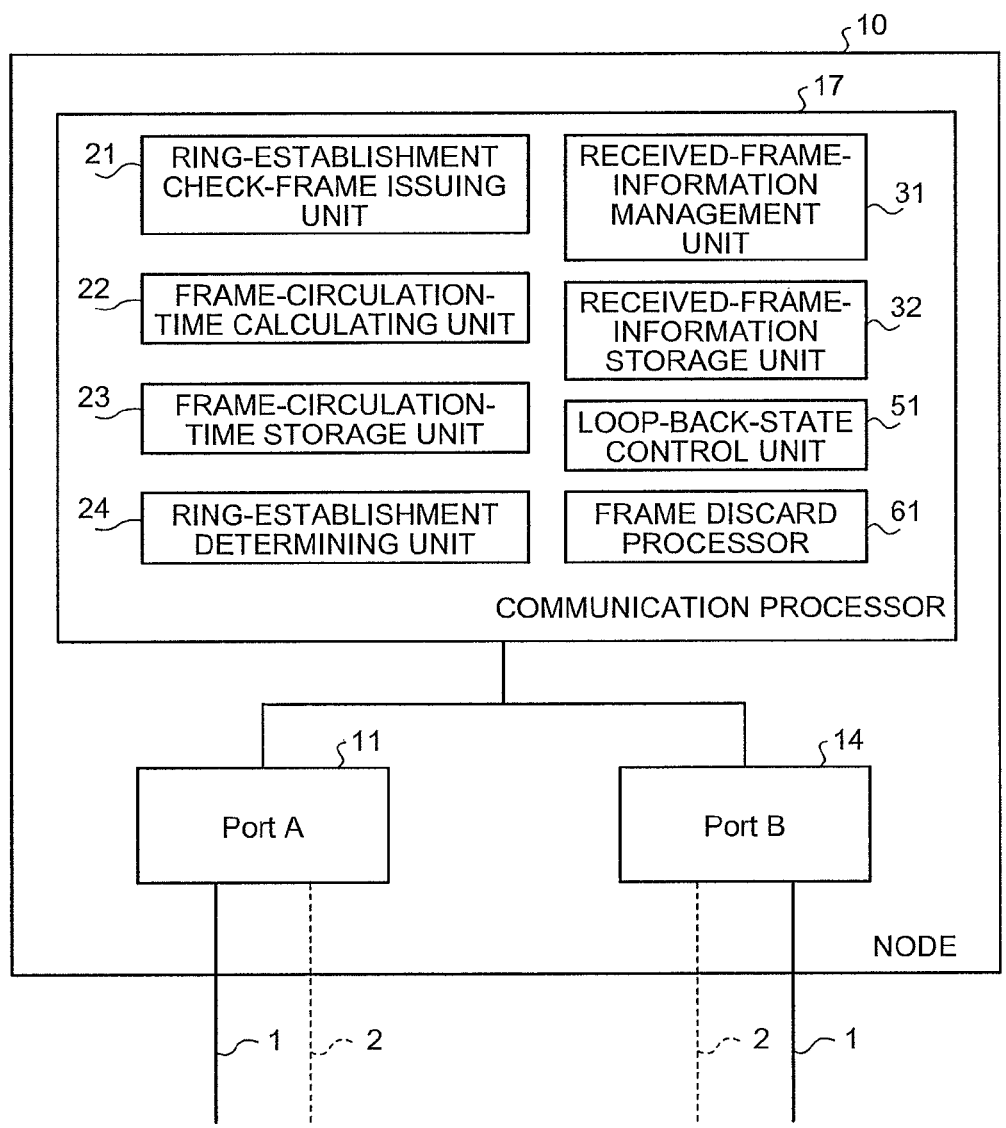
FIG. 15 is a block diagram schematically showing a functional configuration of a communication node according to a seventh embodiment of the present invention.

FIG. 15 is a block diagram schematically showing a functional configuration of a communication node according to the seventh embodiment. The communication processor 17 of a communication node according to the seventh embodiment has a configuration in which a frame discard processor 61 is further provided in FIG. 12 of the fifth embodiment. It is noted that the same numerals are assigned to the same components as these in the explanation, and thus explanation thereof is omitted.

The frame discard processor 61 performs the process of discarding a frame except the ring-establishment check frame in the state of the ring-establishment check process. For example, when a failure occurs in any one of communication nodes that form a network and the communication node is thereby disconnected, the state transits from a normal transmission state in which the token frame is made to pass into the ring to the state of the ring-establishment check process. At that time, however, the frame discard processor 61 discards any frame unrelated to the ring-establishment check process such as the token frame and the data frame passing around a newly reconfigured ring.

Figures 1, 16:
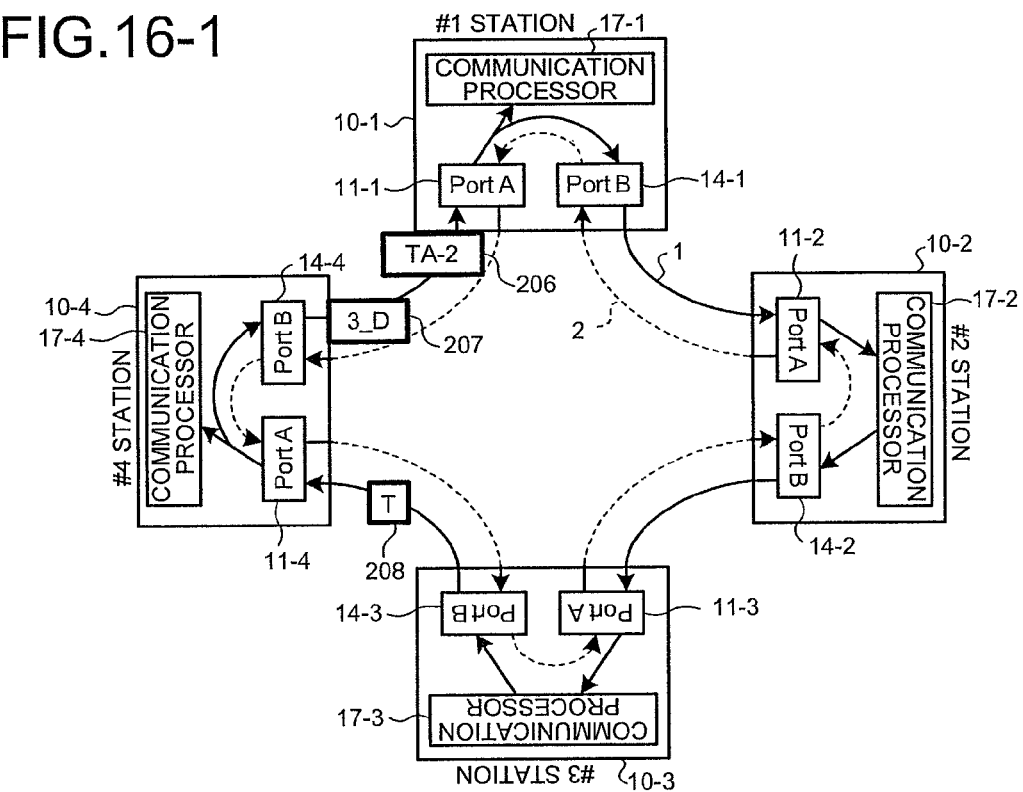
Figures 2, 16:
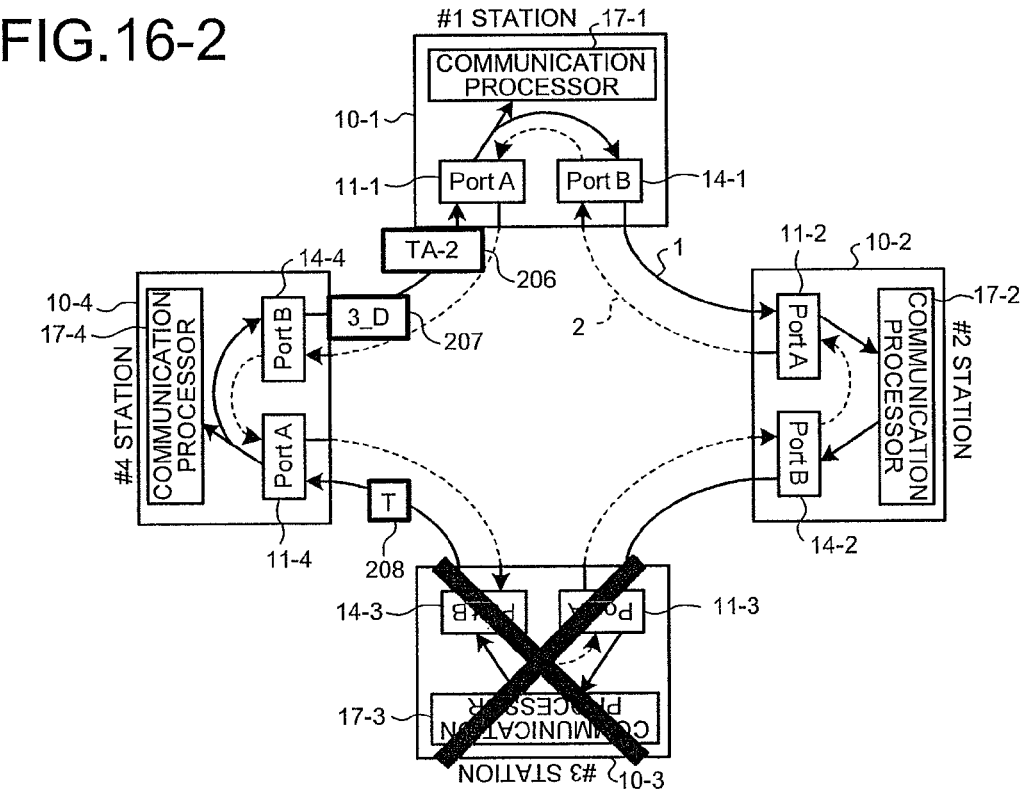
Figures 3, 16:
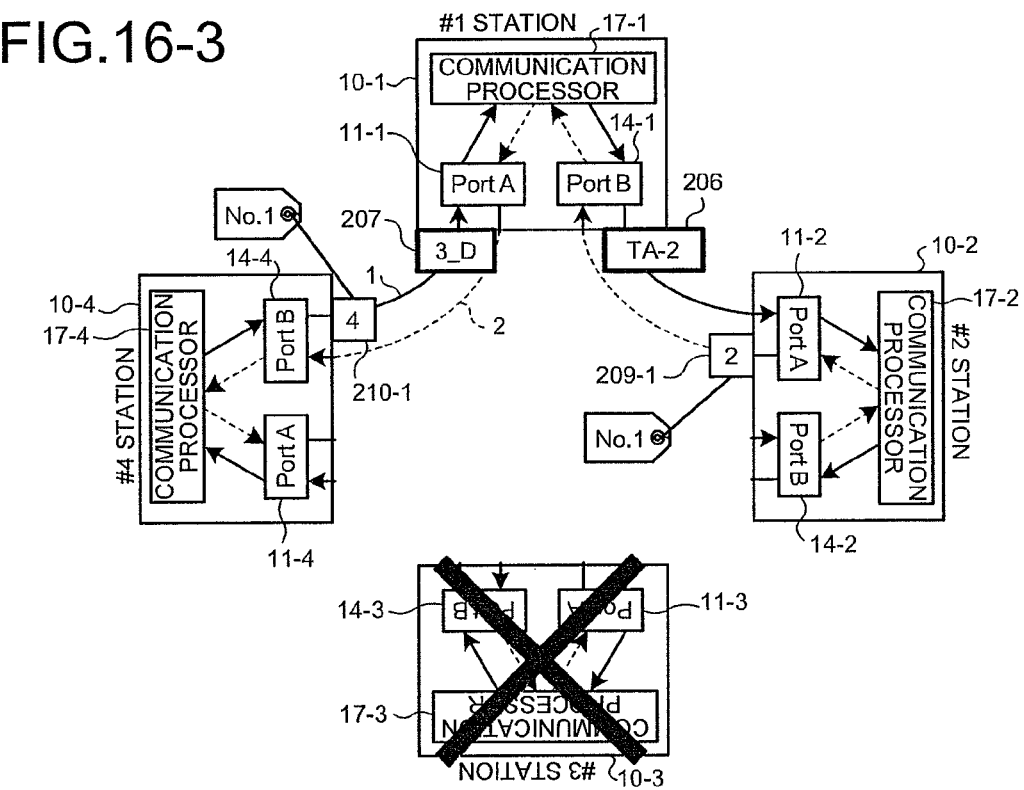
Figures 4, 16:
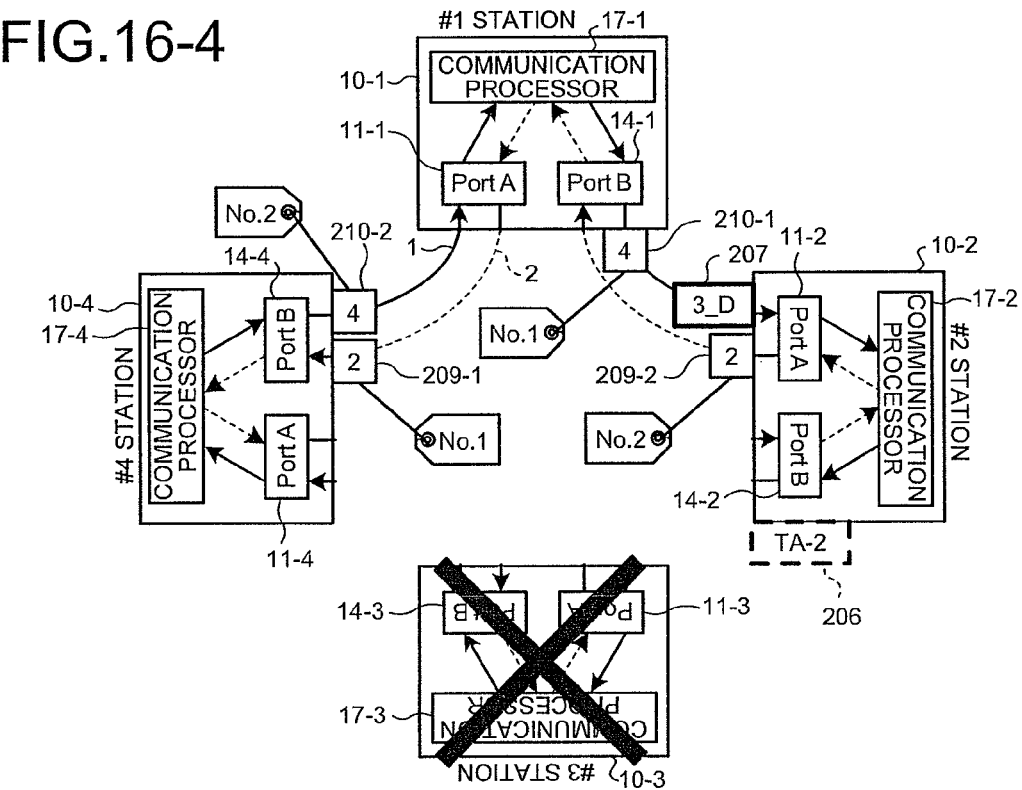
Figures 5, 16:
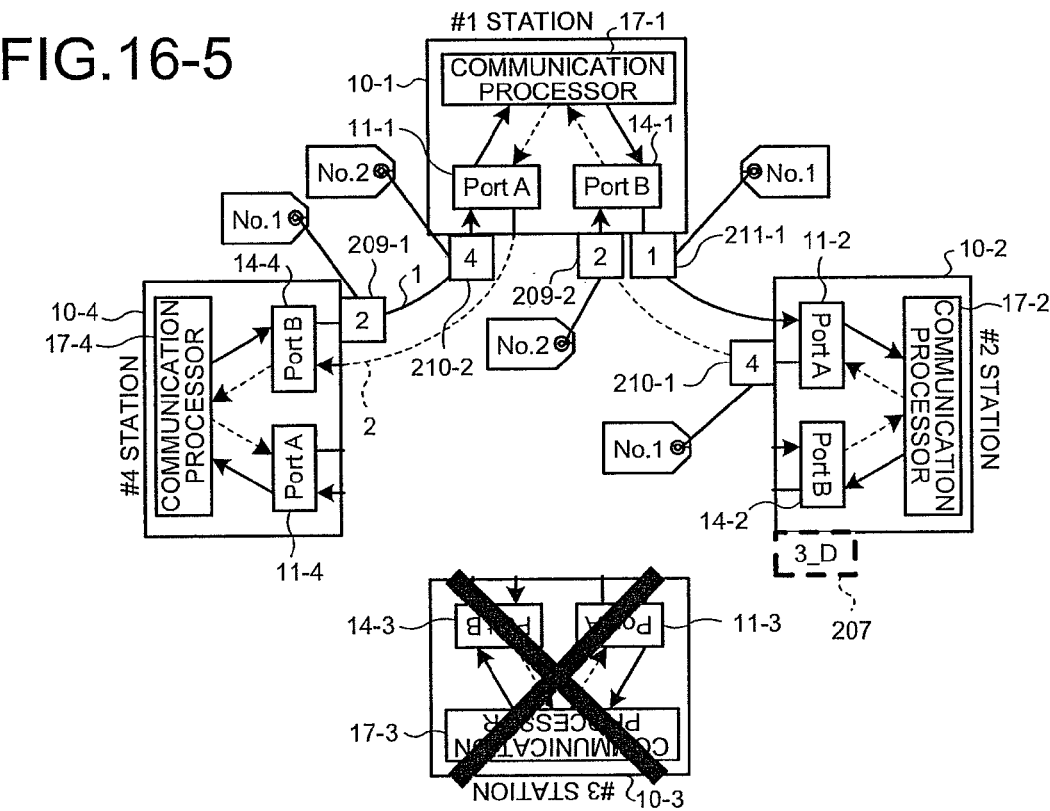

FIG. 16-1 to FIG. 16-5 are diagrams each schematically showing an example of a procedure of deleting a frame unrelated to the ring-establishment check process upon transition from the normal communication state to the state of the ring-establishment check process. First, a network is assumed in the normal communication state. Here, it is assumed that the #3 station 10-3 receives a token frame 208 from the #2 station 10-2 and acquires the right to transmit. Thereafter, the #3 station 10-3 transmits a token-receipt completion notification frame 206 indicating that the own station (#3 station 10-3) acquires the token frame 208, to the #2 station 10-2 being the source of the token frame 208, and releases the token frame 208 after a data frame 207 is transmitted to a communication node to which the data is wished to be transmitted (FIG. 16-1).

Thereafter, a failure is assumed to occur in the #3 station 10-3 (FIG. 16-2). Consequently, the B port 14-2 of the #2 station 10-2 and the A port 11-4 of the #4 station 10-4 detect the occurrence of the failure in the #3 station 10-3, and, as explained in the first embodiment, the #2 station 10-2 performs the loop-back at the A port 11-2 and the #4 station 10-4 performs the loop-back at the B port 14-4. Thus, the token-receipt completion notification frame 206 and the data frame 207 issued by the #3 station 10-3 are left inside a new ring configured due to the loop-back. Further, the #2 station 10-2 and the #4 station 10-4 that detect the failure in the #3 station 10-3 transit from the normal communication state to the state of the ring-establishment check process. The ring-establishment check-frame issuing units 21 of the communication processors 17-2 and 17-4 in the #2 station 10-2 and the #4 station 10-4 start issuing ring-establishment check frames 209-1 and 210-1 respectively (FIG. 16-3). At this time, the #1 station 10-1 is still in the normal communication state. Therefore, the #1 station 10-1 receives the token-receipt completion notification frame 206 from the A port 11-1 and sends it out as it is to the B port 14-1, because the frame is not targeted to the own station.

Moreover, the #2 station 10-2 is in a state of issuing a ring-establishment check frame 209-2 at a predetermined time interval, and is therefore in a state of waiting for its reception, that is, waiting for returning of the ring-establishment check frame issued by the own station. At this time, the frame discard processor 61 of the communication processor 17-2 detects a frame unrelated to the state of the ring-establishment check process, of frames received from the A port 11-2 and discards the frame (FIG. 16-4). Here, the frame discard processor 61 discards the received token-receipt completion notification frame 206. The #4 station 10-4 also issues a ring-establishment check frame 210-2 at a predetermined time interval.

At this time, the #1 station 10-1 receives the first ring-establishment check frame 210-1 sent by the #4 station 10-4 from the A port 11-1, and performs the process of sending it out to the B port 14-1. Consequently, the ring-establishment check-frame issuing unit 21 of the communication processor 17-1 in the #1 station 10-1 learns the transition to the ring-establishment check state, and starts issuing the ring-establishment check frame of the own station. It is noted that the #1 station 10-1 receives the data frame 207 issued by the #3 station 10-3 earlier than the ring-establishment check frame 210-1 sent by the #4 station 10-4, and the #1 station 10-1 is not in the ring-establishment check state upon reception of the data frame 207, and thus the #1 station 10-1 does not discard the data frame at this time.

Thereafter, the frame discard processor 61 of the communication processor 17-2 in the #2 station 10-2 performs the process of discarding the data frame 207, issued by the #3 station 10-3, received from the A port 11-2 (FIG. 16-5). Thus, after the transition from the normal communication state to the state of the ring-establishment check process, the process of discarding the frame having been issued in the normal communication state and being left in the new ring is finished. Thereafter, the ring-establishment check process is performed by the procedure explained in the second to the fifth embodiments.

According to the second embodiment, there is an effect that it is possible to avoid the events in which the frame issued in the communication state remains inside the new ring upon the transition from the normal communication state to the state of the ring-establishment check process.

Eighth Embodiment

An eighth embodiment of the present invention will explain a station-information notification process in which after the ring is established in the second to the sixth embodiments, station information for respective communication nodes is distributed to all the communication nodes on the network.

Figure 17:
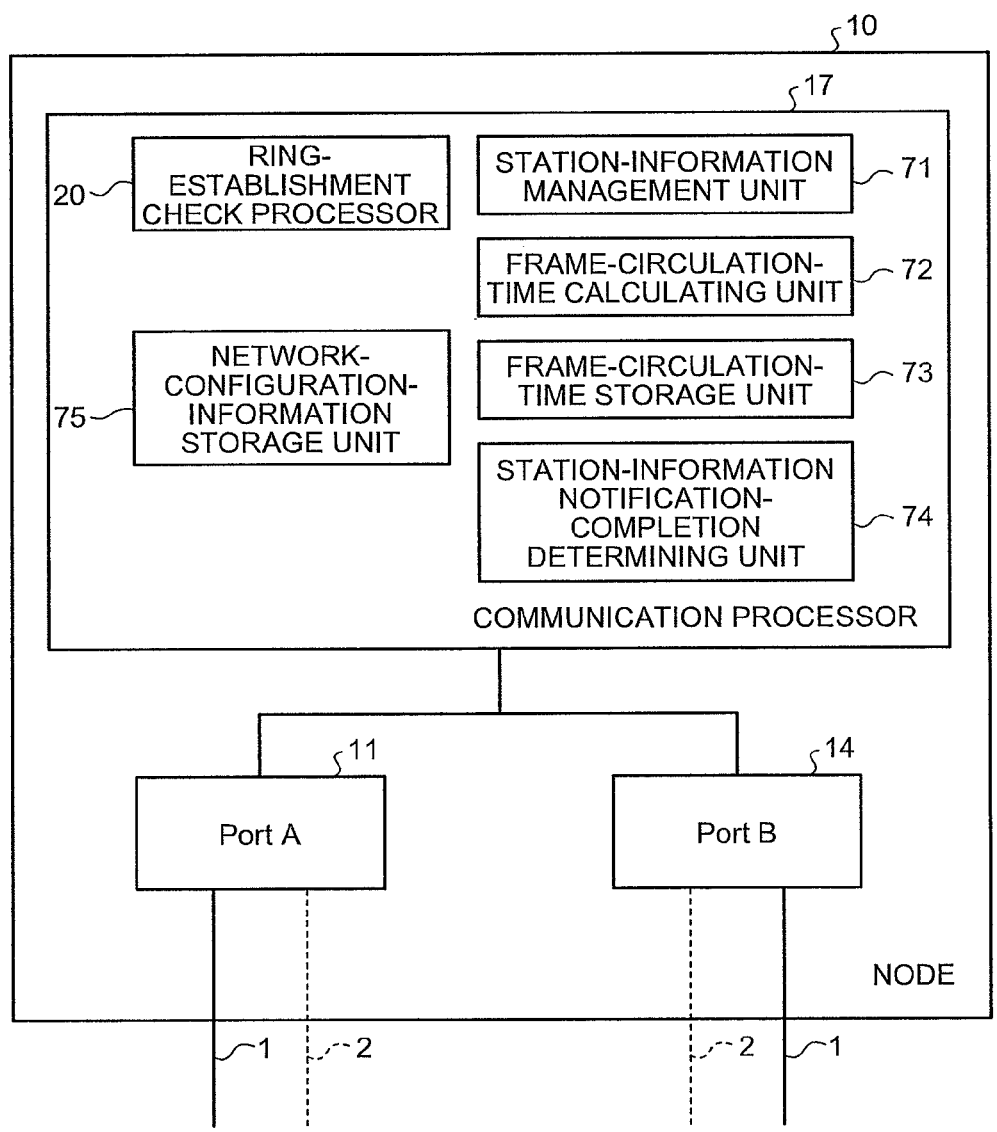
FIG. 17 is a diagram schematically showing a functional configuration of a communication node according to an eighth embodiment of the present invention.

FIG. 17 is a diagram schematically showing a functional configuration of a communication node according to the eighth embodiment. The communication processor 17 of the communication node includes a ring-establishment check processor 20, a station-information management unit 71, a frame-circulation-time calculating unit 72, a frame-circulation-time storage unit 73, a station-information notification-completion determining unit 74, and a network-configuration-information storage unit 75. The ring-establishment check processor 20 integrates the processors in the communication processors 17 that execute the ring-establishment check processes explained in the second to the sixth embodiments. It is noted that the same numerals are assigned to the same components as these in the figures used in the embodiments, and thus explanation thereof is omitted.

After the ring is established in the second to the sixth embodiments, the station-information management unit 71 issues, at a predetermined time interval, a station-information notification frame containing station information for an own communication node required to create configuration information for a network, to all communication nodes in the network in which the ring is established. Embedded in the station-information notification frame is the time of issuing the station-information notification frame. The station-information management unit 71 stops issuing station-information notification frames at the time of first receiving the station-information notification frame transmitted by itself and from then on, and discards the received station-information notification frame. The station information mentioned here includes a MAC address of an own communication node, own-communication-node identification information such as a station number for identifying an own communication node, a loop-back state information indicating which port is in a loop-back state when the own communication node is in the loop-back state, and MAC addresses of upstream and downstream communication nodes. Further, the station-information management unit 71 receives a station-information notification frame transmitted by other communication node, and stores the station information in the network-configuration-information storage unit 75.

The frame-circulation-time calculating unit 72 calculates a difference between a time of receiving the station-information notification frame and an issuance time embedded in the station-information notification frame when the station-information notification frame issued by the own communication node returns from the A port 11, and determines a frame circulation time being a time in which the station-information notification frame has circulated around the ring. The frame-circulation-time storage unit 73 stores the frame circulation time calculated by the frame-circulation-time calculating unit 72.

The station-information notification-completion determining unit 74 determines whether a state in which no station-information notification frame on the network is detected is continued for the frame circulation time or more since the reception of the station-information notification frame last issued by the own communication node or by other communication node after issuing of the station-information notification frame is stopped, and determines that all the communication nodes on the network mutually acquire station information when the state continues for the frame circulation time or more.

The network-configuration-information storage unit 75 stores network configuration information being station information associated with a communication node that configures the network in which the ring is established. Specifically, the network configuration information is information in which the station information received from other communication node is managed in association with the communication node. The network configuration information allows each communication node to learn a connection configuration of the network in which the ring is established, or the like.

Figures 1, 18:
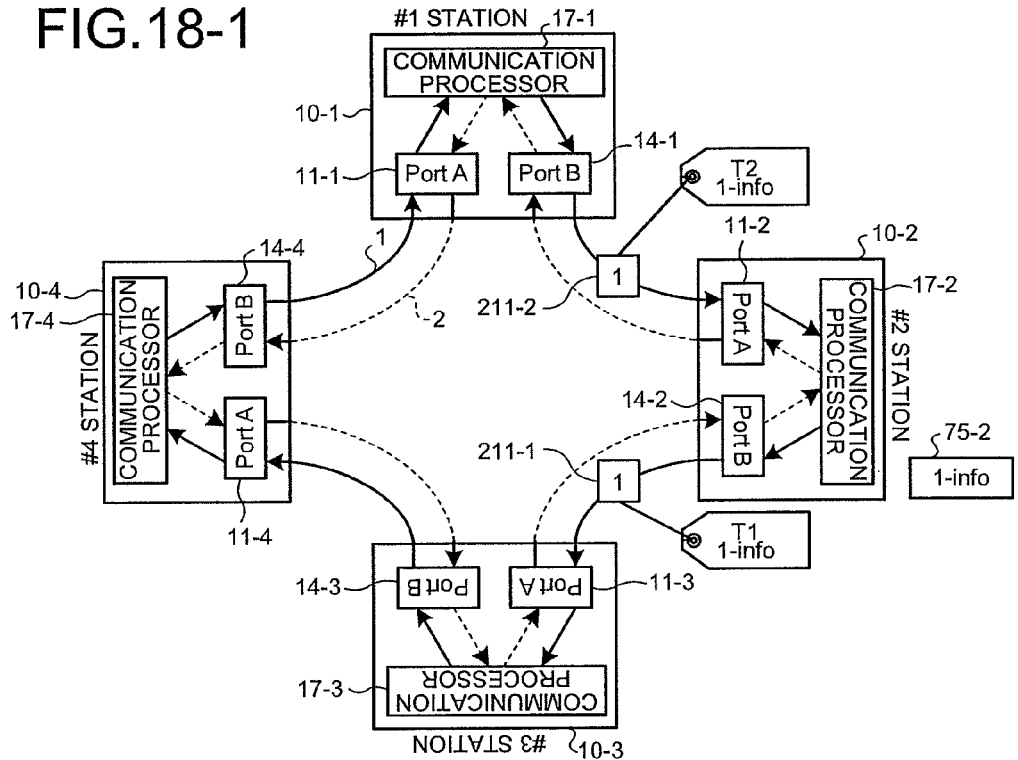
Figures 2, 18:
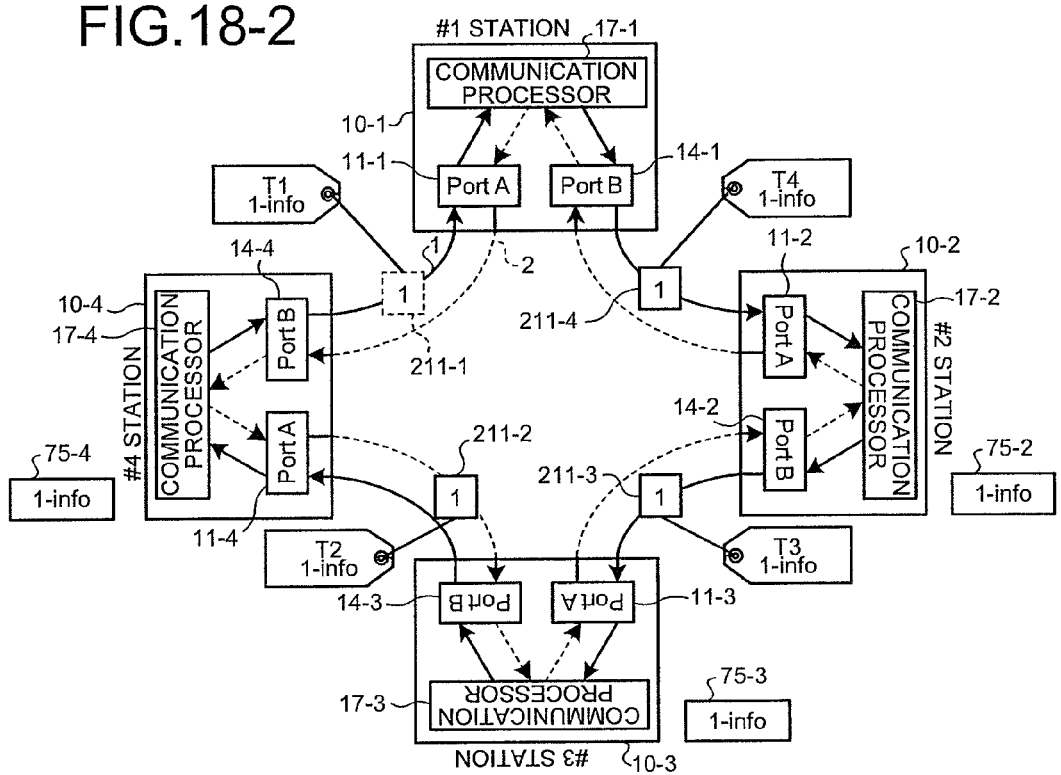
Figures 5, 18:
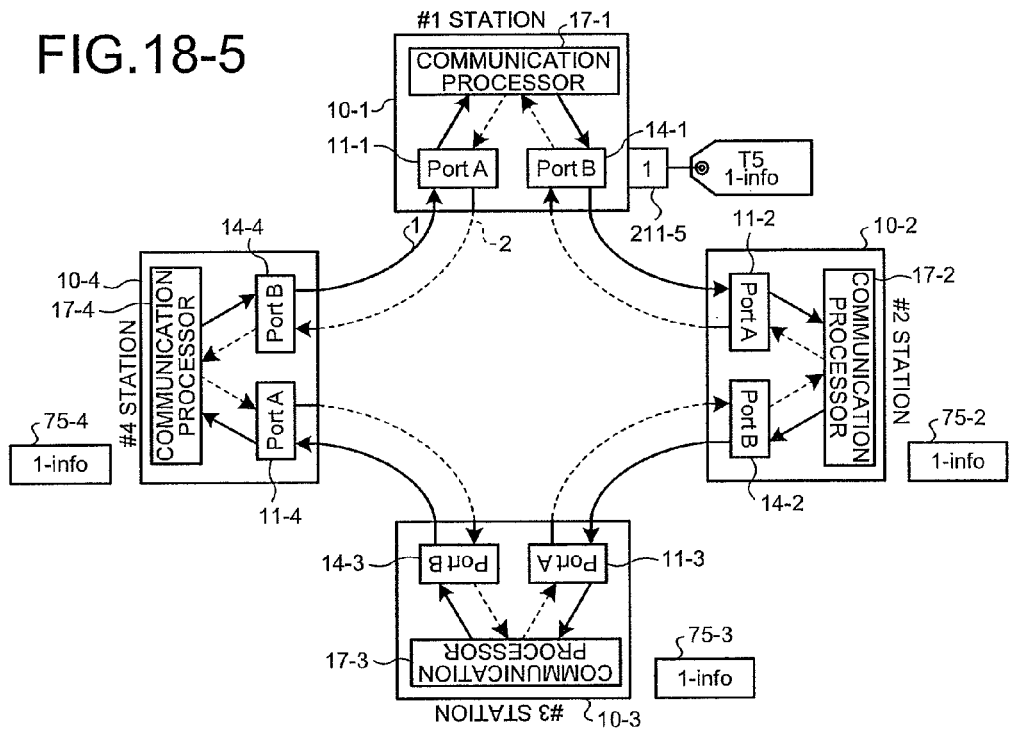
Figures 6, 18:
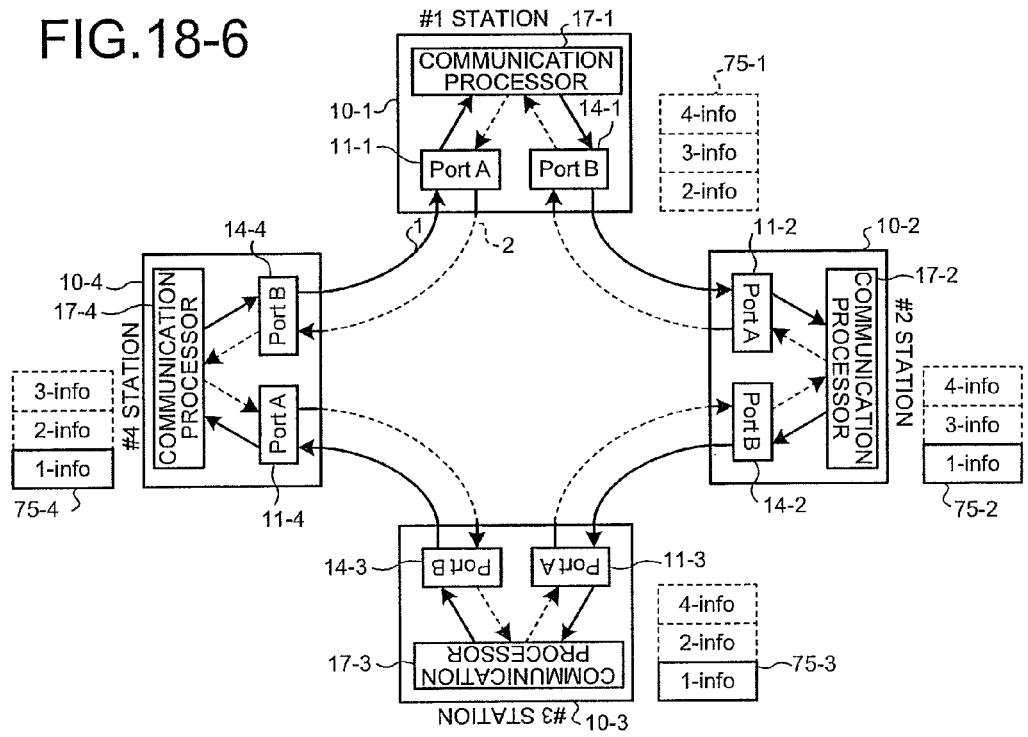

FIG. 18-1 to FIG. 18-6 are diagrams each schematically showing an example of a procedure of a station-information notification process in the ring communication system. First, the station-information management unit 71 of the communication processor 17-1 in the #1 station 10-1 transmits a station-information notification frame containing station information for the #1 station 10-1 with the issuance time embedded therein to the normal-system ring 1 from the B port 14-1 (FIG. 18-1). It is assumed here that the #1 station 10-1 transmits a first station-information notification frame 211-1 containing the station information (1-info) for the #1 station 10-1 to the normal-system ring 1 at time T1 and transmits a second station-information notification frame 211-2 containing the station information (1-info) for the #1 station 10-1 thereto at time T2 when a predetermined time has passed from time T1.

Thereafter, the #1 station 10-1 does not receive the station-information notification frame sent by itself and, therefore, further transmits third and fourth station-information notification frames 211-3 and 211-4 to the normal-system ring 1 at time T3 and time T4, respectively. Thereafter, it is assumed that the first station-information notification frame 211-1 first issued by the #1 station 10-1 is lost between the #4 station 10-4 and the #1 station 10-1 due to some reason (FIG. 18-2). It is noted that when the communication nodes 10-2 to 10-4 except the #1 station 10-1 receive the station-information notification frame sent by the #1 station 10-1, the station-information management units 71 of the communication processors 17-2 to 17-4 copy the station information and store the station information associated with the #1 station 10-1 in network-configuration-information storage units 75-2 to 75-4, respectively.

Subsequently, the #1 station 10-1 receives the second station-information notification frame 211-2 issued by itself by the A port 11-1. Because the first station-information notification frame 211-1 is lost on the network, the second station-information notification frame 211-2 is the first station-information notification frame received by the #1 station 10-1, and a reception time T6 thereof is stored therein. The frame-circulation-time calculating unit 72 of the communication processor 17-1 in the #1 station 10-1 calculates a frame circulation time T (=T6−T2) by subtracting the issuance time T2 embedded in the frame from the reception time T6 of the second station-information notification frame 211-2 (FIG. 18-3). The calculated frame circulation time is stored in the frame-circulation-time storage unit 73. Furthermore, the station-information management unit 71 of the communication processor 17-1 in the #1 station 10-1 discards the returned second station-information notification frame 211-2 from the network. Moreover, the station-information management unit 71 of the communication processor 17-1 in the #1 station 10-1 first receives the station-information notification frame issued by itself and, therefore, stops issuing subsequent station-information notification frames (FIG. 18-4). It is noted that the #1 station 10-1 issues up to a fifth station-information notification frame 211-5 by this time point.

Thereafter, the #1 station 10-1 performs the process of sequentially receiving the station-information notification frames issued by the own station and discarding them, and receives the last issued fifth station-information notification frame 211-5 and discards it, and the station-information notification frames issued by the #1 station 10-1 is thereby eliminated from the network (FIG. 18-5). The processes from FIG. 18-1 to FIG. 18-5 are simultaneously performed by the other #2 station 10-2 to #4 station 10-4 which form the network.

When all the station-information notification frames 211-1 to 211-5 issued by the #1 station 10-1 are discarded from the network in FIG. 18-5, the station-information notification-completion determining unit 74 of the communication processor 17-1 in the #1 station 10-1 starts counting whether absolutely no station-information notification frame passes through the network for the frame circulation time or more determined in FIG. 18-3. Specifically, the station-information notification-completion determining unit 74 sets the frame circulation time in the timer, and determines whether the station-information notification frames sent by the other communication nodes 10-2 to 10-4 are detected by the time the timeout occurs. During the determination, the station-information notification-completion determining unit 74 resets the timer each time the station-information notification frame sent by any one of the other communication nodes 10-2 to 10-4 is received from the A port 11-1. This is because it is not only checked that the station information for the own station is distributed to all the communication nodes 10-1 to 10-4 but also checked that the station information for the other stations is distributed to all the communication nodes 10-1 to 10-4. When the state in which no station-information notification frame is observed on the network is continued for the frame circulation time T or more after issuing of the station-information notification frame is stopped, that is, when the timeout occurs in the timer, the station-information notification-completion determining unit 74 determines that all the other communication nodes on the network can also cause the station information to be distributed to all the communication nodes (FIG. 18-6). It is noted that "2-info", "3-info", and "4-info" in FIG. 18-6 represent station information contained in the station-information notification frames sent by the #2 station, the #3 station, and the #4 station, respectively.

According to the eighth embodiment, after the ring is established, the station-information notification frame containing the station information for each own communication node is caused to circulate around the ring, and thus, returning again of the station-information notification frame to the own station enables to confirm that the other stations receive the station-information notification frame. Consequently, there is no need to receive acknowledgement messages from the communication nodes after the station information is notified to the communication nodes unlike the case in which the ring is constructed with the conventional Ethernet (registered trademark) or the like. Therefore, the eighth embodiment has an effect that the number of necessary frames can be reduced and sharing of the station information for all the communication nodes can easily be checked.

Besides, the communication node is configured to continue to issue the station-information notification frame and stop issuing the station-information notification frame when the station-information notification frame issued by itself is first returned. Therefore, the eighth embodiment has also an effect that delay in notification of the station information due to loss of the station-information notification frame on the channel thereof can be prevented and a time required for handling the loss thereof can be reduced.

Moreover, a frame circulation time in which the station-information notification frame circulates around the ring is counted, and it is determined whether all the communication nodes on the network distribute the station information to one another using the frame circulation time. Therefore, the eighth embodiment has an effect that a time (timeout value) for determining whether all the communication nodes on the network distribute the station information to one another can be set according to a ring configuration (number of communication nodes). Thus, because there is a difference in the timeout value between a ring configuration with a small number of communication nodes and a ring configuration with a large number of communication nodes, when the ring configuration has a small number of communication nodes, setting for exchange of station information is more quickly completed.

INDUSTRIAL APPLICABILITY

As explained above, the Ethernet (registered trademark)-base ring communication system according to the present invention is useful for a network formed of a plurality of communication nodes.

The invention claimed is:

1. A communication node that forms a communication system in which a plurality of communication nodes are connected to each other in a ring by Ethernet (registered trademark), the communication node comprising:
a first port that includes an input unit that receives a frame and an output unit that outputs a frame;
a second port that includes an input unit that receives a frame and an output unit that outputs a frame; and
a communication processor that performs a process of receiving a frame input from the input unit of the first port and transmits the frame from the output unit of the second port when the first port and the second port are respectively in normal states, performs, when communication abnormality occurs between the communication node and a neighboring communication node, a loop-back process being a process of receiving a frame input from an input unit of a port on the other side of a port connected to the neighboring communication node and transmitting the frame from an output unit of the same port as the input unit to which the frame has been input, and when other communication node performs the loop-back process, transmits the frame from the output unit of the first port without performing a process of receiving a frame input from the input unit of the second port, wherein
the communication processor issues a ring-establishment check frame when power is turned on or when an own communication node performs a loop-back process to configure a new ring.

2. The communication node according to claim 1, wherein when receiving the ring-establishment check frame, the communication processor stops issuing a subsequent ring-establishment check frame.

3. The communication node according to claim 1, wherein the communication processor discards a frame unrelated to a ring-establishment check process among received frames, upon transition from a state in which a token frame is made to pass into the ring and communication is performed using a token passing system to a state of the ring-establishment check process.

4. The communication node according to claim 2, wherein the communication processor discards a frame unrelated to a ring-establishment check process among received frames, upon transition from a state in which a token frame is made to pass into the ring and communication is performed using a token passing system to a state of the ring-establishment check process.

5. A ring-establishment check method in a communication system in which a plurality of communication nodes are connected to each other in a ring by Ethernet (registered trademark), the ring-establishment check method comprising:

a ring-establishment-check-frame issuing step of issuing, when power is turned on or when an own communication node performs a loop-back process by the communication node to configure a new ring, a ring-establishment check frame, and, when receiving a ring-establishment check frame, stopping issuing a subsequent ring-establishment check frame.

6. The ring-establishment check method in the communication system according to claim 5, further comprising a ring-establishment checking step of checking that the ring has been established, by receiving the ring-establishment check frame issued by the communication node at the ring-establishment-check-frame issuing step.

7. The ring-establishment check method in the communication system according to claim 5, further comprising a frame discard processing step of discarding a frame unrelated to a ring-establishment check process among received frames, upon transition from a state in which a token frame is made to pass into the ring and communication is performed using a token passing system to the ring-establishment checking step of checking ring establishment.

8. The ring-establishment check method in the communication system according to claim 6, further comprising a frame discard processing step of discarding a frame unrelated to a ring-establishment check process among received frames, upon transition from a state in which a token frame is made to pass into the ring and communication is performed using a token passing system to the ring-establishment checking step of checking ring establishment.

* * * * *